United States Patent
Hidaka et al.

(10) Patent No.: US 6,952,341 B2
(45) Date of Patent: Oct. 4, 2005

(54) MODULE MOUNTING/REMOVING MECHANISM AND DISK ARRAY

(75) Inventors: Hiroshi Hidaka, Kawasaki (JP);
Takashi Yamamoto, Kawasaki (JP);
Masayuki Korikawa, Kawasaki (JP);
Katsuhisa Katano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 10/309,995

(22) Filed: Dec. 4, 2002

(65) Prior Publication Data

US 2004/0012921 A1 Jan. 22, 2004

(30) Foreign Application Priority Data

Jul. 16, 2002 (JP) ........................................ 2002-207040

(51) Int. Cl.$^7$ ................................................. G06F 1/16
(52) U.S. Cl. ..................... 361/685; 361/684; 312/332.1
(58) Field of Search ................................ 361/681, 683, 361/684–685, 721–727, 753, 759, 801–802, 816, 818, 788, 797–798, 749, 747, 692, 693; 312/223.1, 223.2, 319.1, 319.2; 211/26, 41.17; 206/701–702; 174/35 R; 360/137 D, 900, 97.01, 98.01; 248/60, 581, 608, 611, 346.03, 504, 346.04

(56) References Cited

U.S. PATENT DOCUMENTS

| | | | | | |
|---|---|---|---|---|---|
| 5,557,499 | A | * | 9/1996 | Reiter et al. | 361/685 |
| 5,588,728 | A | * | 12/1996 | Eldridge et al. | 312/332.1 |
| 5,604,662 | A | * | 2/1997 | Anderson et al. | 361/685 |
| 5,797,667 | A | * | 8/1998 | Wu | 312/332.1 |
| 5,868,261 | A | * | 2/1999 | Collins et al. | 211/26 |
| 5,975,735 | A | * | 11/1999 | Schmitt | 700/2 |
| 6,049,451 | A | * | 4/2000 | Schmitt et al. | 361/685 |
| 6,052,278 | A | * | 4/2000 | Tanzer et al. | 361/685 |
| 6,058,016 | A | * | 5/2000 | Anderson et al. | 361/727 |
| 6,069,789 | A | * | 5/2000 | Jung | 361/684 |
| 6,166,900 | A | * | 12/2000 | Flynn et al. | 361/685 |
| 6,272,010 | B1 | * | 8/2001 | Schmitt | 361/685 |
| 6,288,902 | B1 | * | 9/2001 | Kim et al. | 361/725 |
| 6,317,329 | B1 | * | 11/2001 | Dowdy et al. | 361/725 |
| 6,325,353 | B1 | * | 12/2001 | Jiang | 248/682 |
| 6,351,379 | B1 | * | 2/2002 | Cheng | 361/685 |
| 6,356,441 | B1 | * | 3/2002 | Claprood | 361/685 |
| 6,381,139 | B1 | * | 4/2002 | Sun | 361/725 |
| 6,421,236 | B1 | * | 7/2002 | Montoya et al. | 361/685 |
| 6,450,597 | B1 | * | 9/2002 | Bell et al. | 312/223.1 |
| 6,483,107 | B1 | * | 11/2002 | Rabinovitz et al. | 250/239 |
| 6,490,153 | B1 | * | 12/2002 | Casebolt et al. | 361/685 |
| 6,565,163 | B2 | * | 5/2003 | Behl et al. | 312/223.1 |
| 6,603,657 | B2 | * | 8/2003 | Tanzer et al. | 361/685 |
| 6,646,869 | B2 | * | 11/2003 | Horiuchi et al. | 361/685 |
| 6,648,149 | B2 | * | 11/2003 | Robertson | 211/26 |

FOREIGN PATENT DOCUMENTS

| | | |
|---|---|---|
| JP | 61-20083 | 2/1986 |
| JP | 6-336141 | 12/1994 |
| JP | 11-149753 | 6/1999 |
| JP | 2001-148185 | 5/2001 |
| JP | 2001-155475 | 6/2001 |
| JP | 2002-030846 | 1/2002 |

* cited by examiner

*Primary Examiner*—Michael Datskovskiy
(74) *Attorney, Agent, or Firm*—Greer, Burns & Crain, Ltd.

(57) ABSTRACT

A disk array apparatus includes an enclosure having an opening at its front face, at least one module configured to be mounted in the enclosure and at least one securing mechanism configured to secure the at least one module to the enclosure. The module includes a frame member and a lever member that is movable between a first position received by the frame member in which it serves as a cover of the opening and a second position in which it serves as a grip part for pulling the module out of the enclosure.

16 Claims, 22 Drawing Sheets

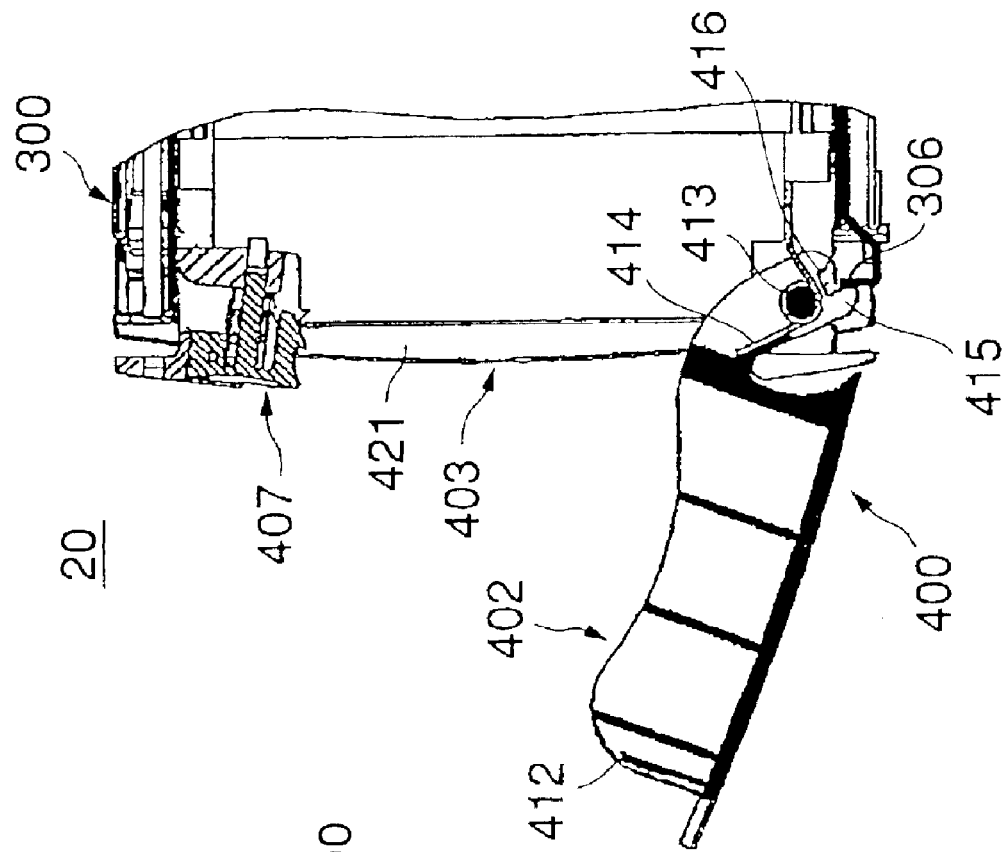
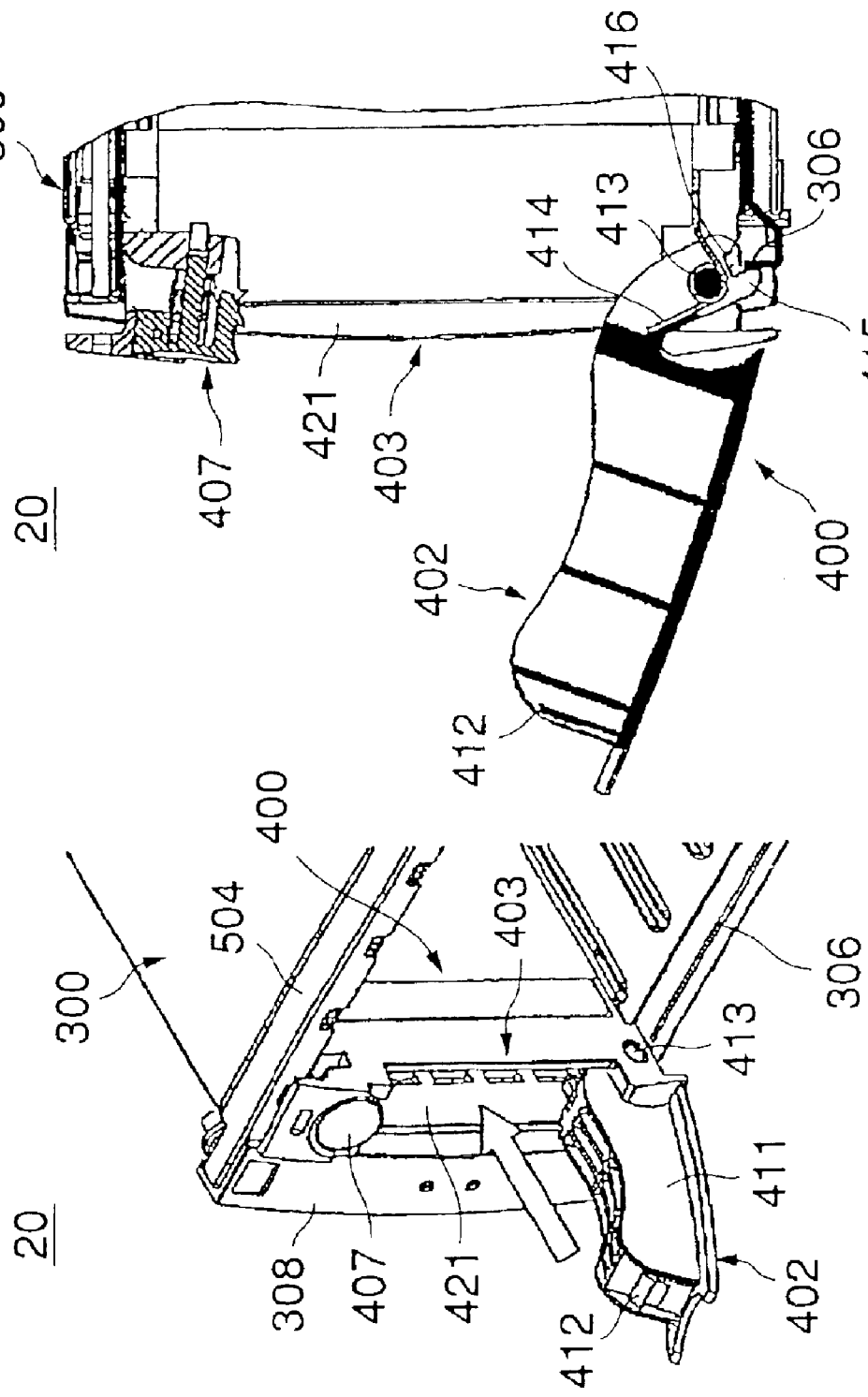

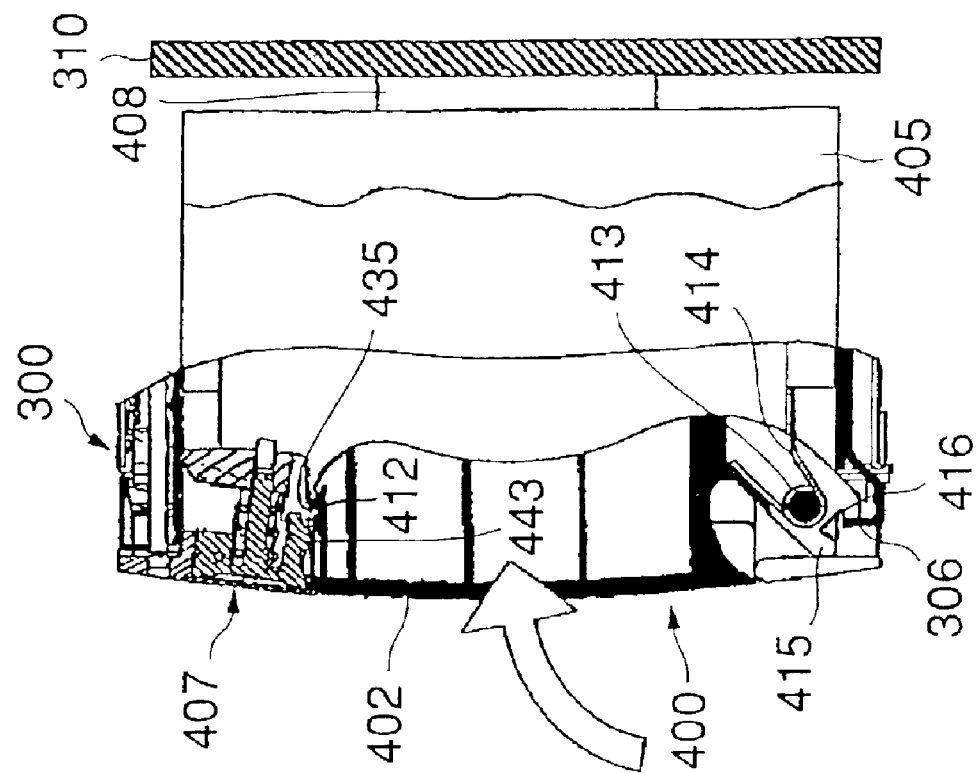
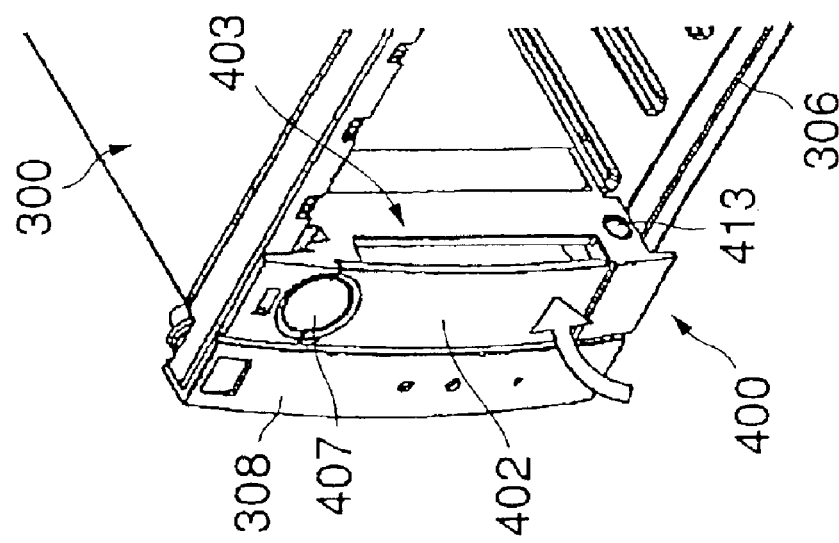

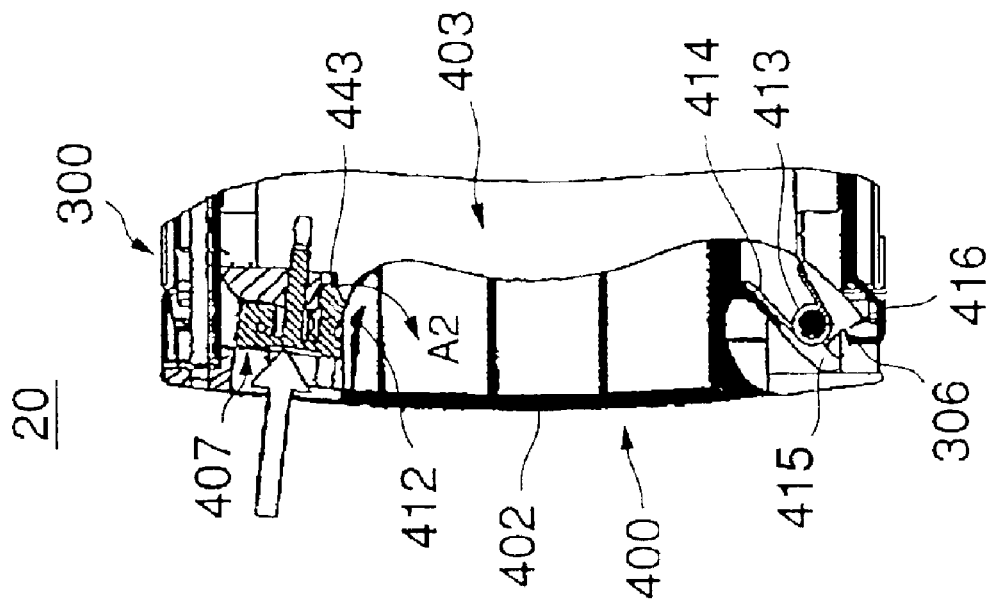
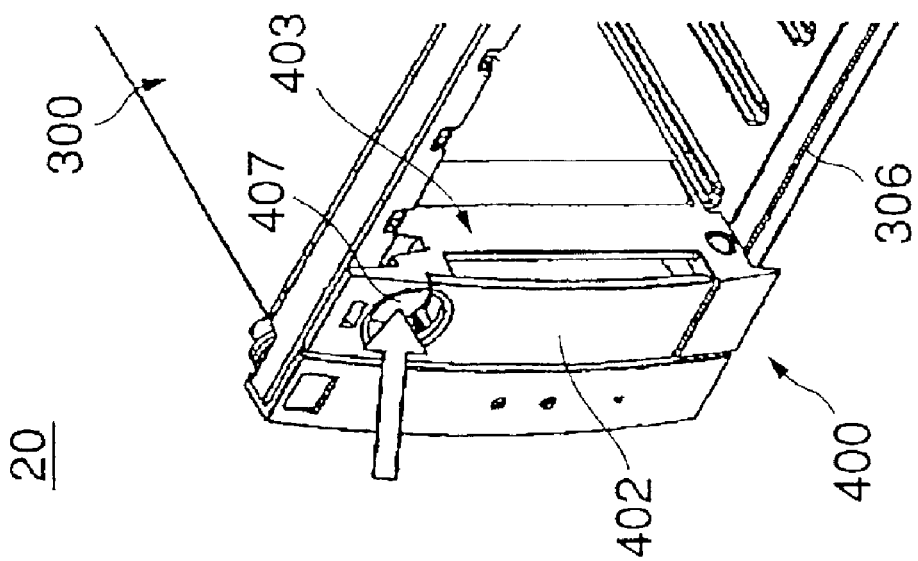

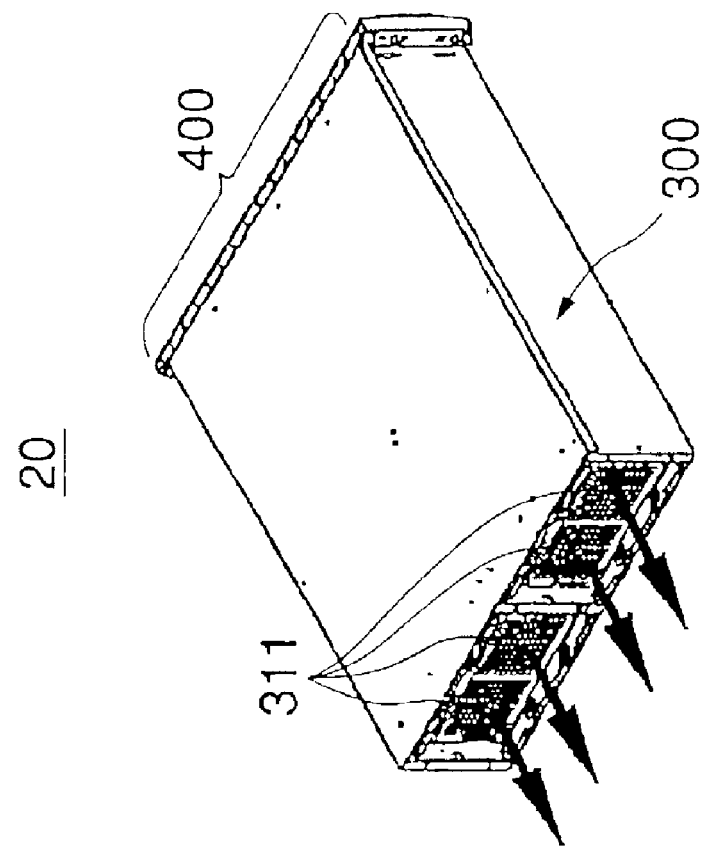
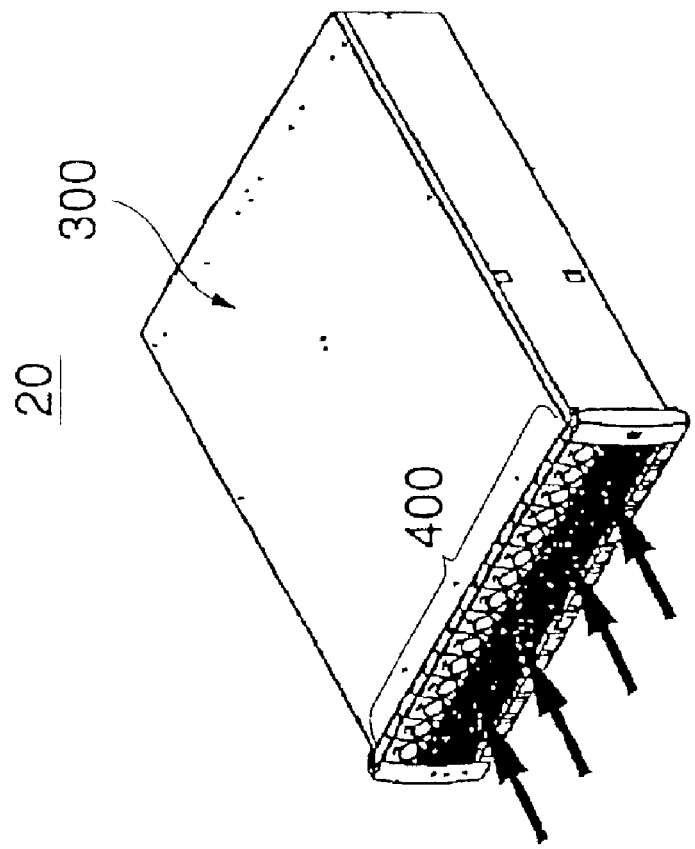

UNLOCKED

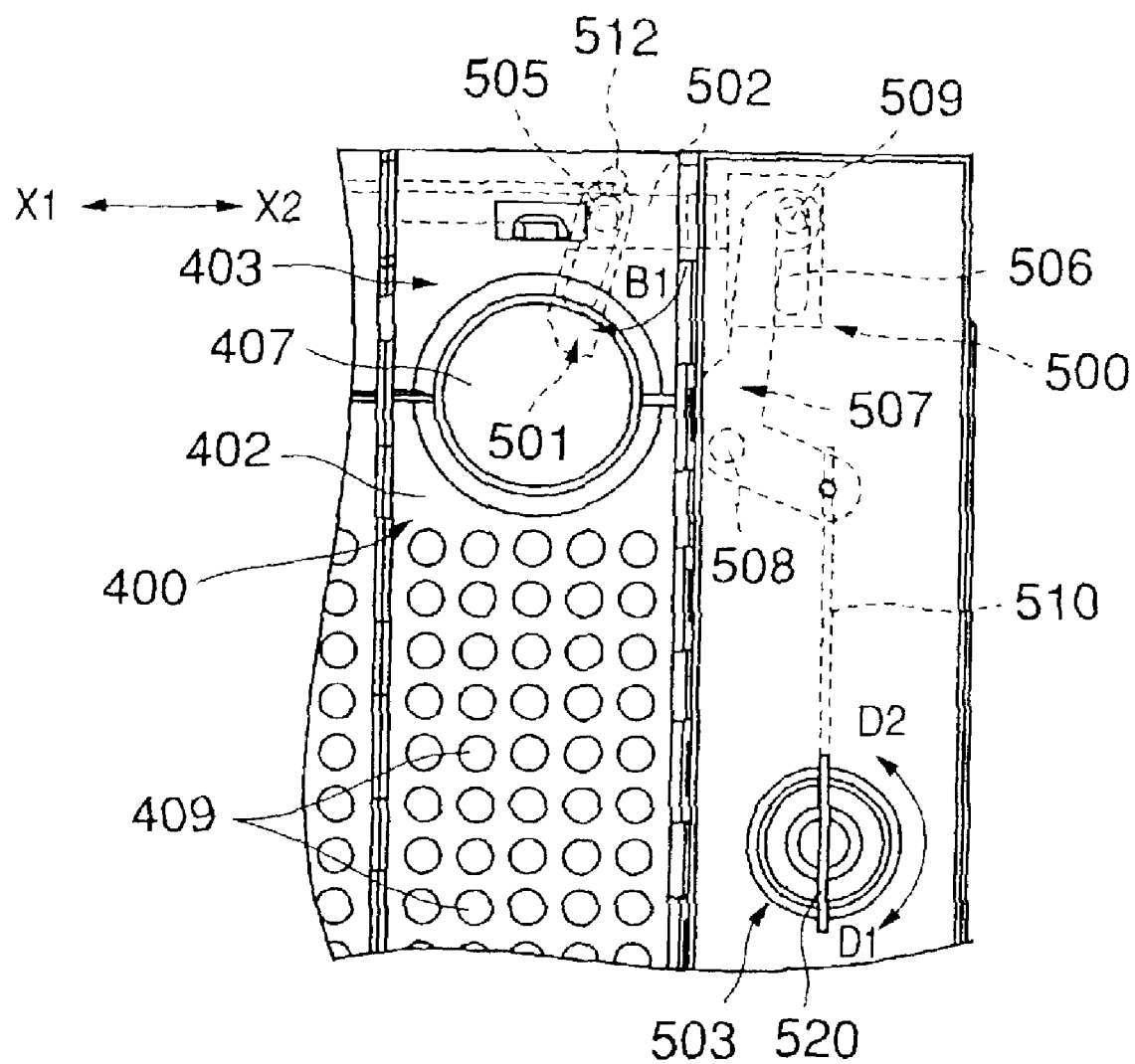

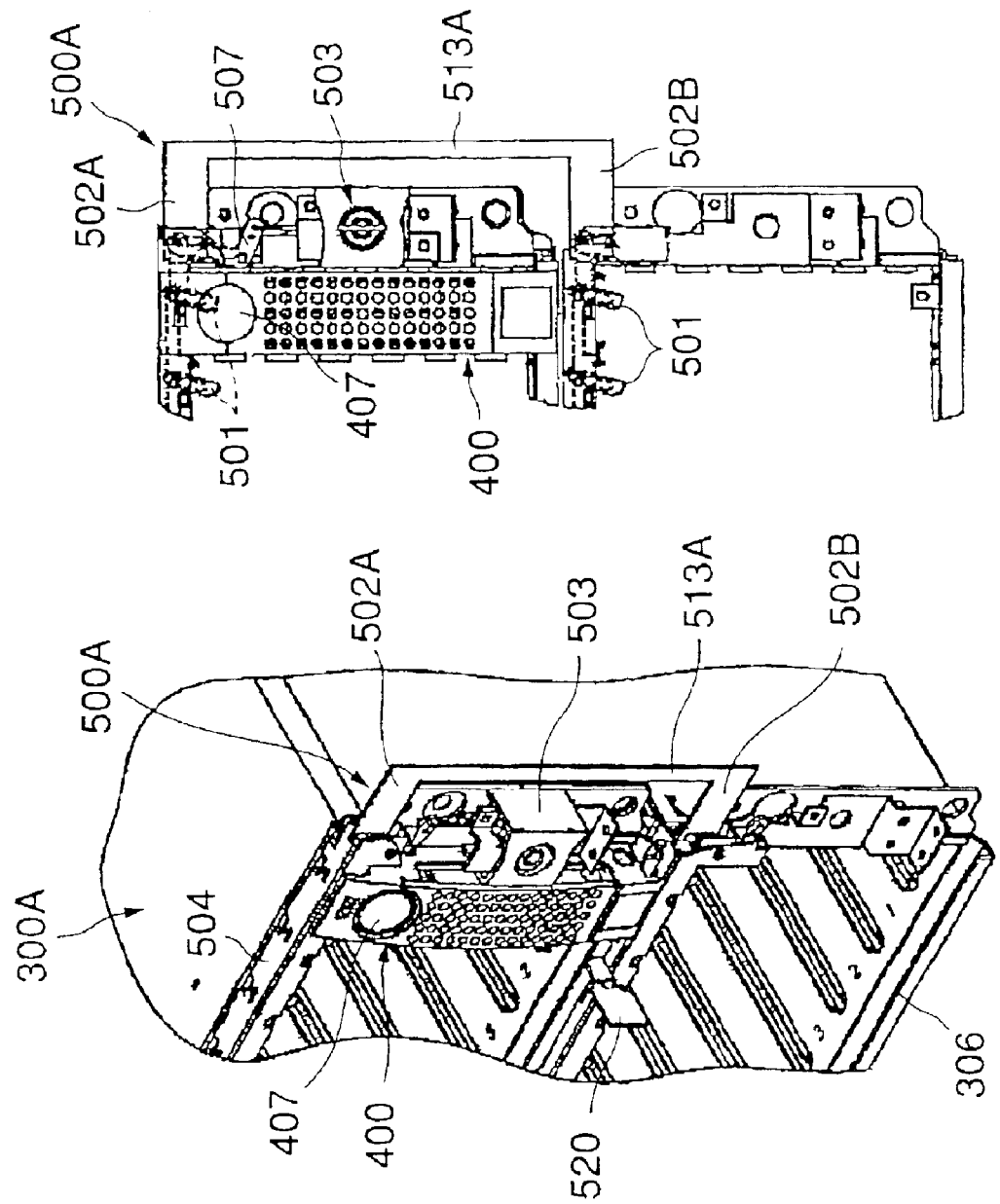

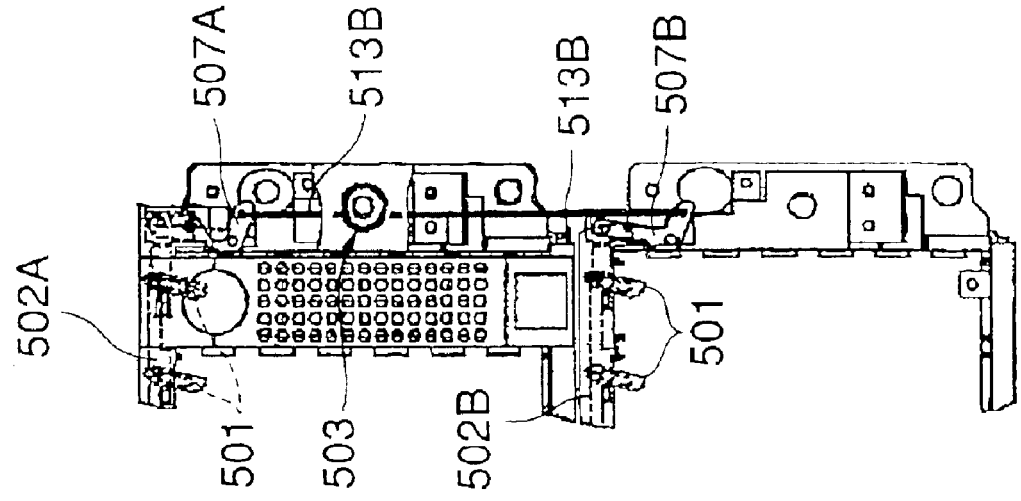
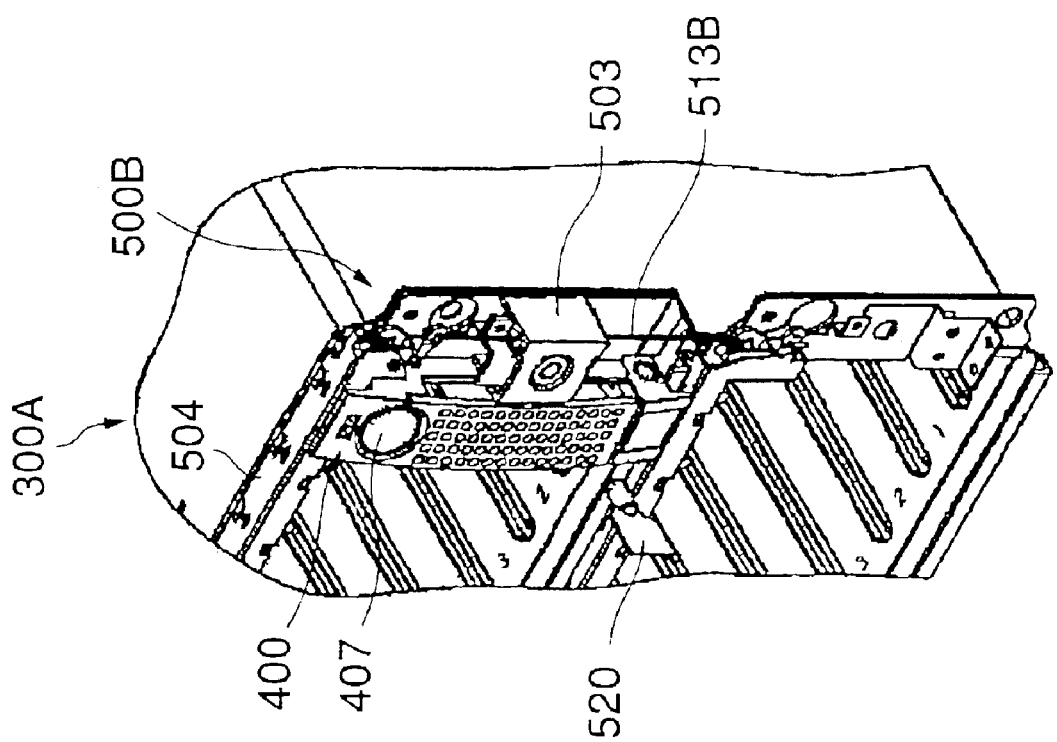

MODULE MOUNTING/REMOVING MECHANISM AND DISK ARRAY

BACKGROUND OF THE INVENTION

1. Field of the Invention

The present invention generally relates to a module mounting/removing mechanism and particularly relates to a disk array device in which a plurality of detachable hard disk drive devices can be loaded.

2. Description of the Related Art

There has been a need for a mass storage external storage device that can be accessed at high speed with high reliability. In order to provide such an external storage device, a disk array device is known in which a plurality of modules each containing a hard disk drive device (HDD) can be loaded. For the maintenance of such a disk array device, one or more of the modules (hard disk drive device) requiring maintenance are replaced while the disk array device as a whole remains in operation.

Further, if a third person has free access to the disk array device, the module(s) could be inadvertently detached from the disk array device during a recording or reproducing operation. This may result in damage of data, the module(s) or the disk array device. Accordingly, for improved security, a disk array device is generally provided with a lock system to prevent the modules to be easily mounted to or removed from an enclosure (housing) of the disk array device.

Generally, the lock system has a keylock mechanism. The key for unlocking the lock system is possessed by an authorized person such as a person in charge of maintenance of the disk array device. When maintenance is required, the lock system is unlocked using the key, so as to enable the module(s) from being mounted to or removed from the enclosure.

FIGS. 1 and 2 are a perspective diagram and an exploded perspective diagram, respectively, of a disk array device 10 of the related art. The disk array device 10 includes an enclosure 15 and a plurality of modules 11 capable of being loaded into the enclosure 15.

As can be seen in FIG. 2, the module 11 generally includes a main body 14 and a lever 12. The lever 12 is provided on a front face of the main body 14 such that it is pivotable about an axis extending along a connecting part between the lever 12 and the main body 14.

When mounting or removing the module 11 to/from the enclosure 15, the lever 12 is tipped forward such that it can be grasped to mount or remove the module 11 to/from the enclosure 15. Thus, the module 11 can be easily mounted to or removed from the enclosure 15.

Further, as has been described above, if the module 11 can be freely mounted to or removed from the enclosure 15, the data or various devices may be damaged due to an inadvertent mounting or removing operation. In order to prevent a third person from mounting or removing the module(s) 11 to/from the disk array device 10 without permission, a bezel cover 13 serving as a security means and having a keylock mechanism 16 is provided on the front face of the disk array device 10. The keylock mechanism 16 operates in such a manner that, when the key is inserted and turned, the bezel cover 13 is fastened to the locking part 17 of the enclosure 15.

Therefore, in order to mount or remove the module 11 to/from the disk array device 10 of the related art, it is necessary to first open the bezel cover 13 by unlocking the keylock mechanism 16, then to tip forward the lever 12 of the module 11, and finally to mount or remove the module 11 to/from the enclosure 15.

In other words, in the related art, it is necessary to perform opening and closing operations for two members, i.e., the lever 12 and the bezel cover 13. Therefore, it is troublesome to mount or remove the module 11 and it gives rise to poor operability.

Also, the lever 12 cannot be tipped in a one-touch manner in the related art. That is to say, in order to tip the lever 12 forward from the unit main body 14, it is necessary to catch the top end part of the lever 12 by the tip of the operator's finger and then pivot the lever 12. This also gives rise to poor operability.

Further, in the related art, the lever 12 and the bezel cover 13 are provided as two separate members. With such a structure, the disk array device 10 becomes bulky due to the thickness of the bezel cover 13.

SUMMARY OF THE INVENTION

Accordingly, it is a general object of the present invention to provide a module mounting/removing mechanism and a disk array device that can obviate the problems described above.

It is another and more specific object of the present invention to provide a module mounting/removing mechanism and a disk array device that can improve operability of a mounting/removing operation and a locking operation of the module.

In order to achieve the above object, a disk array apparatus includes:

an enclosure having an opening at its front face;

at least one module configured to be mounted in the enclosure, the module having a frame member and a lever member that is movable between a first position received by the frame member in which it serves as a cover of the opening and a second position in which it serves as a grip part for pulling the module out of the enclosure; and at least one securing mechanism configured to secure the at least one module to the enclosure.

With the invention described above, since the lever member has a dual function as a cover and as a grip part, the disk array apparatus can be manufactured with a reduced number of components. Also, since the lever member serves as a cover, an operation of removing the cover from the holder and an operation of moving the lever member into the second position can be performed in a single operation. Therefore, the module can be mounted to and/or removed from the enclosure in a simple and facilitated manner. Further, with an operation button, the engagement of the lever member by the engagement mechanism can be easily released. This also facilitates the operation of mounting and removing the module to and from the enclosure.

The lever member of the present invention is provided with cooling holes. Therefore, electronic devices that may be contained in the modules can be cooled in an efficient manner.

The disk array apparatus of the present invention is also provided with a keylock mechanism. Therefore, the modules can be prevented from being mistakenly removed from the enclosure.

BRIEF DESCRIPTION OF THE DRAWINGS

FIGS. 9A and 9B are diagrams showing how the module is loaded into the enclosure using a module mounting/removing mechanism of an embodiment of the present invention.

FIGS. 10A and 10B are diagrams showing how the module is loaded into the enclosure using a module mounting/removing mechanism of an embodiment of the present invention.

FIGS. 11A and 11B are diagrams showing how the module is unloaded from the enclosure using a module mounting/removing mechanism of an embodiment of the present invention.

FIGS. 14A and 14B are diagrams showing a cooling mechanism of electronics in the module mounting/removing mechanism of an embodiment of the present invention.

FIG. 20 is a diagram showing an operation of the security lock for a locking operation.

FIGS. 21A and 21B are diagrams showing a security lock part provided on an enclosure of a two-level structure.

FIGS. 22A and 22B are diagrams showing a security lock part provided on an enclosure of a two-level structure.

DETAILED DESCRIPTION OF THE PREFERRED EMBODIMENTS

In the following, principles and embodiments of the present invention will be described with reference to the accompanying drawings.

Figure 3:
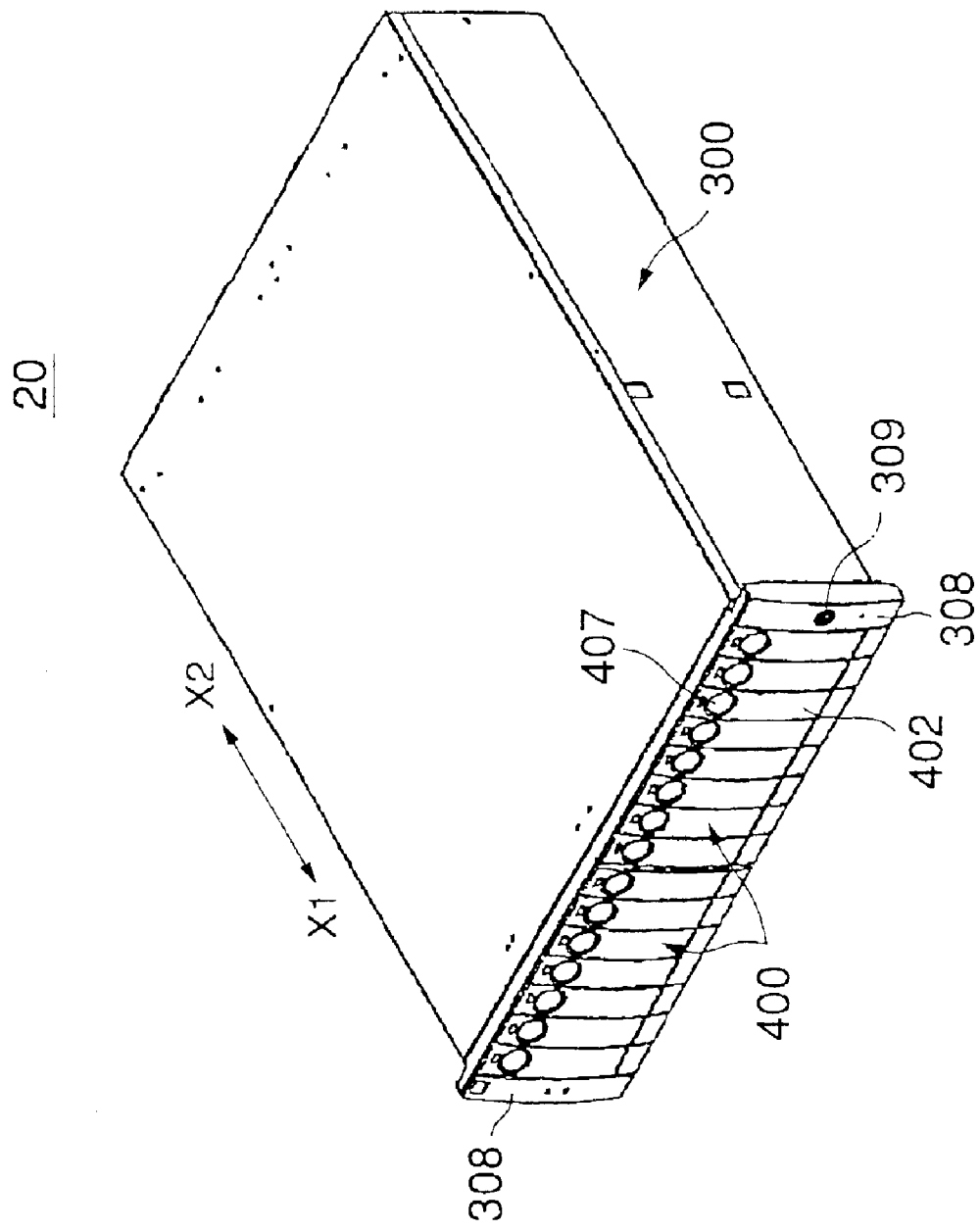
FIG. 3 is a perspective diagram showing a disk array device having a module mounting/removing mechanism of an embodiment of the present invention.
Figure 4:
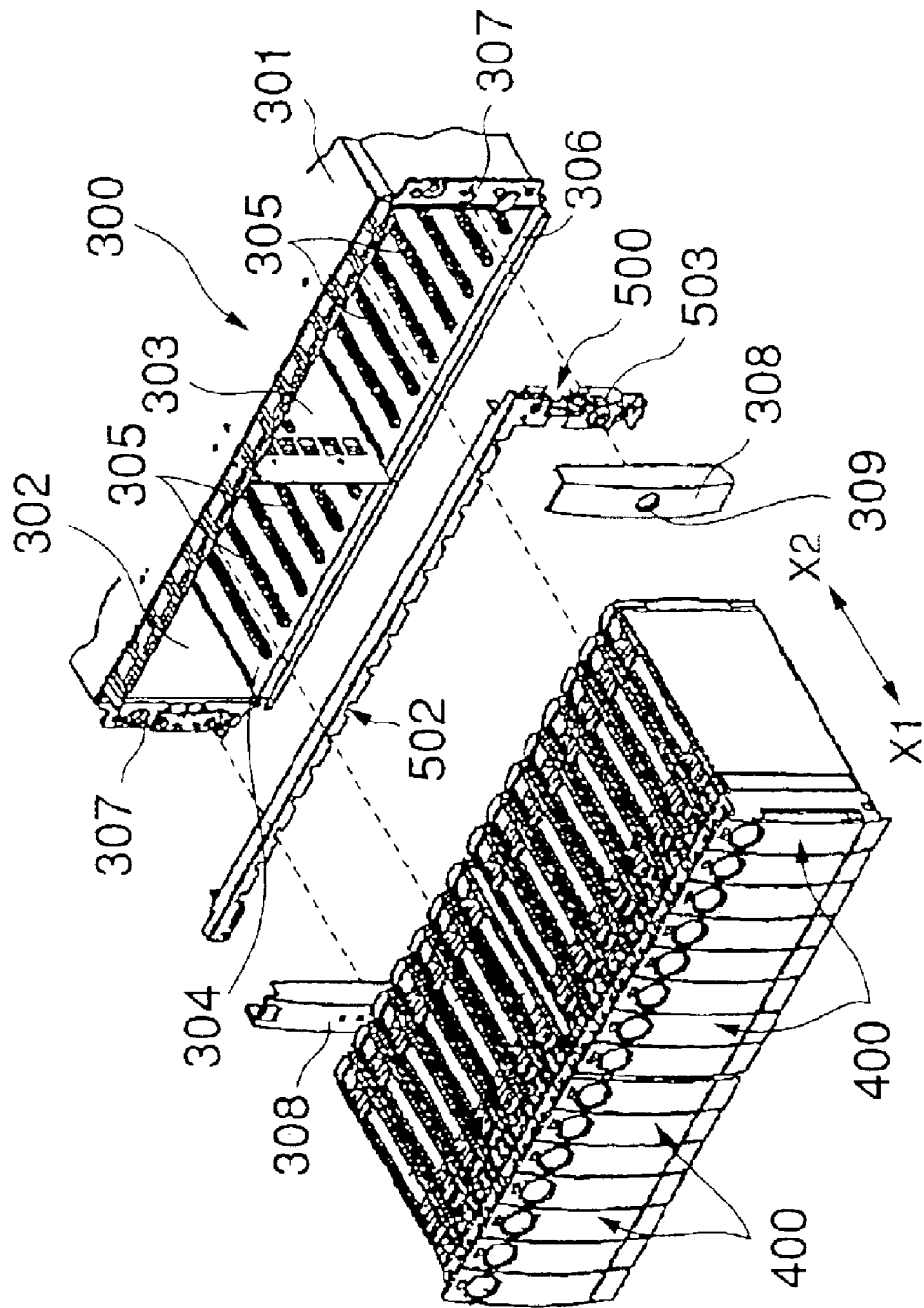
FIG. 4 is an exploded perspective diagram showing a disk array device having a module mounting/removing mechanism of an embodiment of the present invention.

FIG. 3 is a perspective diagram showing a disk array device 20 having a module mounting/removing mechanism of an embodiment of the present invention. FIG. 4 is an exploded perspective diagram showing a major part of the disk array device 20. The disk array device 20 is an auxiliary storage device of a mainframe computer and is mainly used as a data backup storage device.

As can be seen in FIGS. 3 and 4, the disk array device 20 generally includes an enclosure 300, a plurality of modules 400 and a security lock part 500.

The enclosure 300 is configured such that the plurality of modules 400 can be mounted thereto and removed therefrom. As can be seen in FIG. 4, an opening part 302 is formed on the front face of the enclosure 300. The modules 400 can be mounted and removed via the opening part 302. A partition wall 303 is provided at the center of the enclosure 300 such that the enclosure 300 is divided into two compartments. In the embodiment shown in FIGS. 3 and 4, one compartment (the left compartment in the figures) is capable of accommodating seven modules 400 and the other compartment (the right compartment in the figures) is capable of accommodating eight modules 400.

The enclosure 300 is provided with a base plate 304 whereon guide parts 305 and a rail part 306 are formed. The guide parts 305 are linearly formed protrusions that extend from the region near the front face towards the back face of the enclosure 300. When mounting the module 400 into the enclosure 300, the module 400 is guided by these guiding parts 305. The rail part 306 is formed on the base plate 304 along the bottom longitudinal side of the opening part 302. As will be described later, the rail 306 is used for positively loading the modules 400 into the enclosure 300.

Further, collar parts 307 are provided on the side walls of the enclosure 300 at positions along the opening part 302. A security lock part 500, which will be described later, is provided on the collar part 307. Side covers 308 serving as trim boards are provided for covering the collar parts 307. One of the side cover 308 covers the security lock part 500 and is provided with a key insertion hole 309 whereto a key for locking and unlocking the security lock part 500 is inserted.

Also, as can be seen in FIGS. 3 and 4, the depth (dimension along the X1–X2 direction) of the enclosure 300 is greater than the length of the module 400. This is because certain electronic circuits and cooling fans 311 (see FIG. 14) are provided beyond the loading area of the modules 400.

Figure 5:
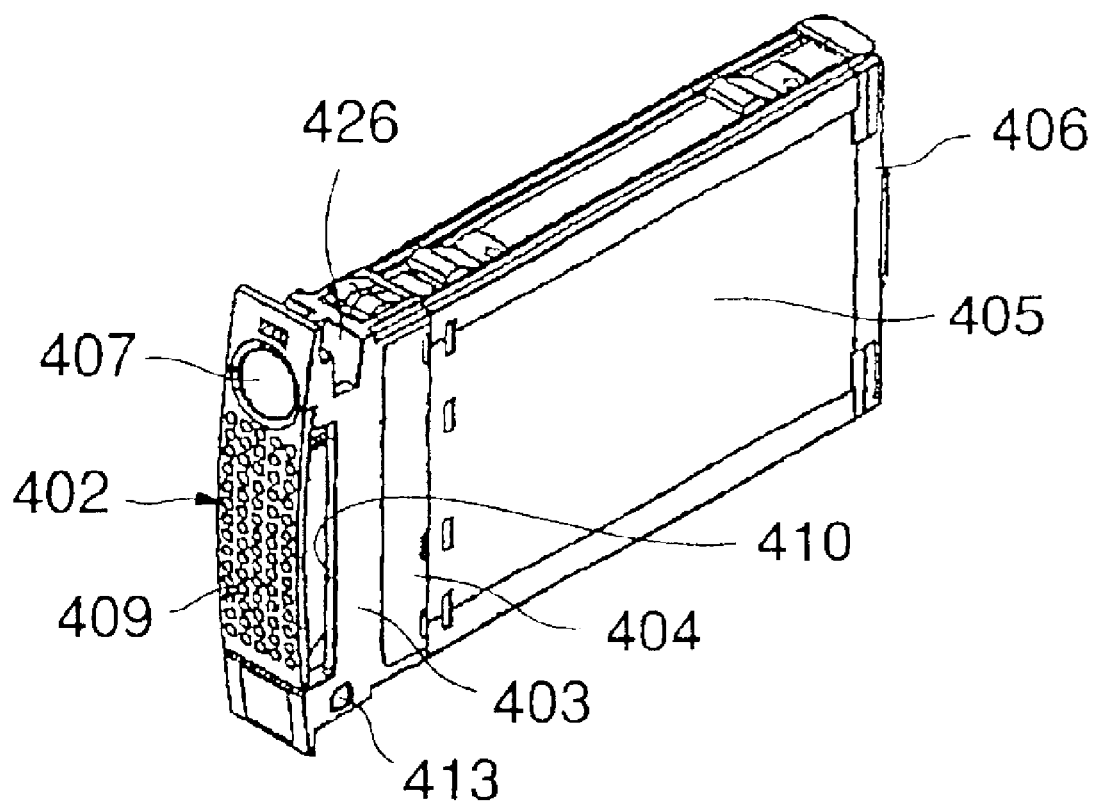
FIG. 5 is a perspective diagram showing a module whereto a module mounting/removing mechanism of an embodiment of the present invention is applied.
Figure 6:
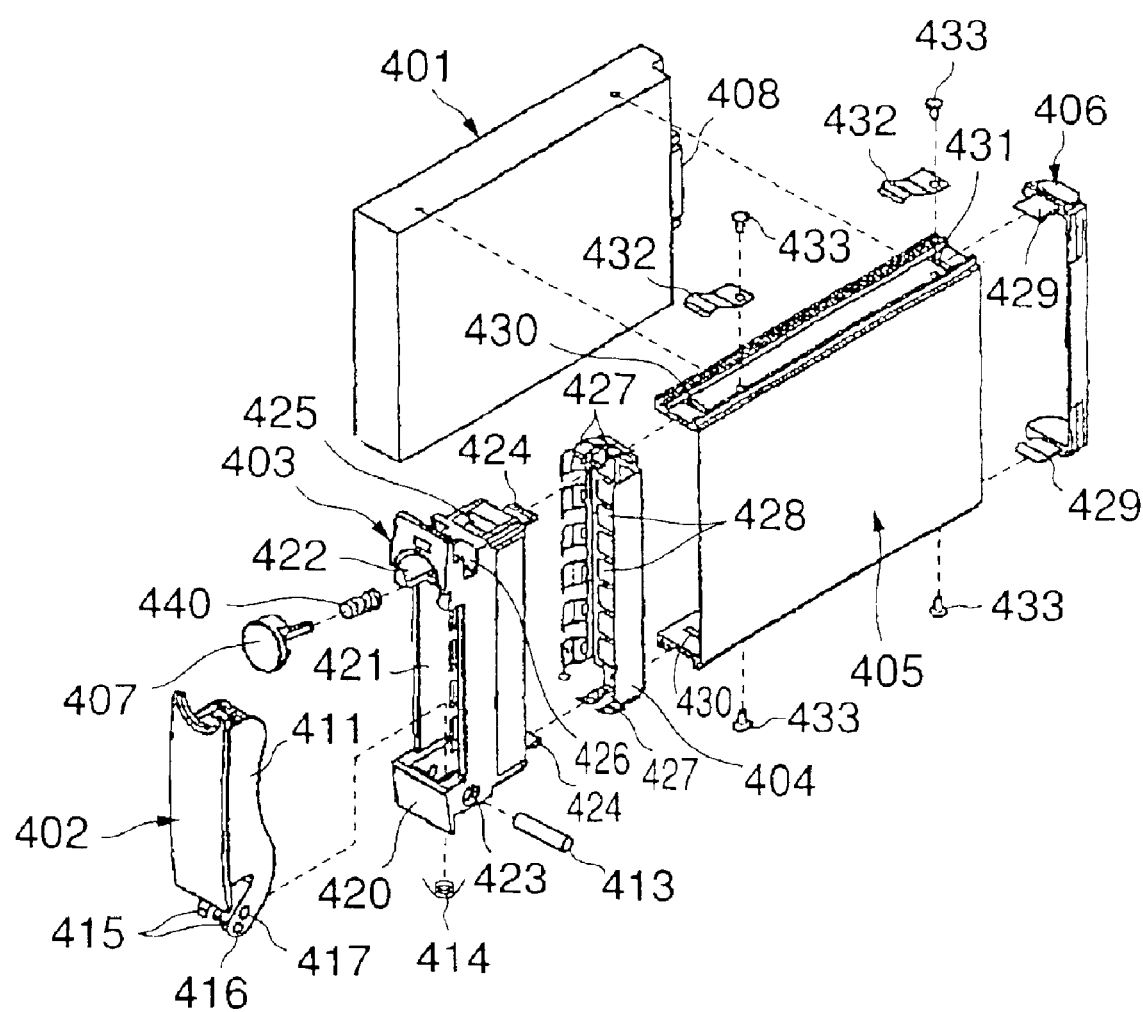
FIG. 6 is an exploded perspective diagram showing a module whereto a module mounting/removing mechanism of an embodiment of the present invention is applied.
Figure 7:
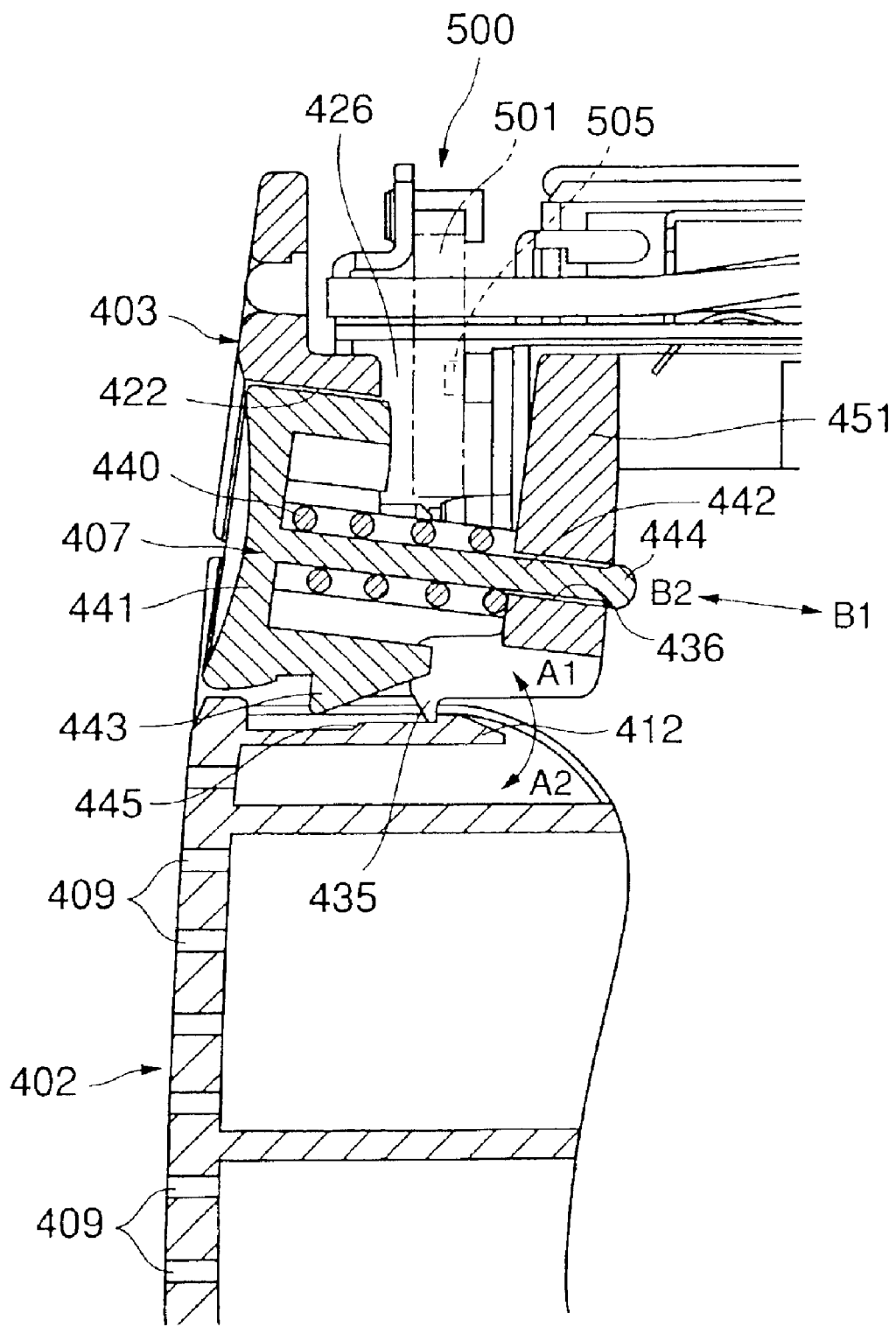
FIG. 7 is an enlarged cross-sectional diagram showing a region near an operation button of the module.

The module 400 will be described with reference to FIGS. 5 through 7. FIG. 5 is a perspective diagram showing the module 400, FIG. 6 is an exploded perspective diagram showing the module 400 and FIG. 7 is an enlarged cross-sectional diagram showing a region near an operation button 407 of the module 400.

The module 400 may contain an electronic device installed therein. In the present embodiment, a hard disk drive device (hereinafter referred to as a "HDD") 401 will be taken as an example of the electronic device. As shown in FIG. 4, in order to achieve a mass storage compact disk array device, a plurality of disk devices are loaded with almost no gaps between them. According to the present embodiment, with the disk devices being loaded in such a manner, each disk device can be freely mounted or removed from the disk array device. It is to be noted that electronic devices provided inside the module 400 are not limited to HDDs but may be any electronic devices.

The module 400 generally includes a HDD 401, a lever 402, a lever holder 403, a shield spring 404, a frame 405, a rear holder 406 and an operation button 407.

The HDD 401 is a device for recording and reproducing data to/from a magnetic disk installed in the HDD 401. At the rear part of the HDD 401, a connector 408 is provided that is to be electrically connected to a back board 310 provided on the enclosure 300 (see FIG. 10B). The HDD 401 is fixed on the frame 405 that serves as a magnetic shield. It is to be noted that in the description below, the term "front" refers to a direction shown by an arrow X1 in FIGS. 3 and 4 and the term "rear" refers to a direction shown by an arrow X2 in FIGS. 3 and 4.

As can be seen in FIG. 6, the frame 405 is a pressed metal plate having a magnetic shield effect and having a substantially rectangular cross-section with one of its sides being dispensed with. The HDD 401 is secured to the frame 405 by means of screws 433. At the top part of the frame 405, buffer springs 432 are also secured to the frame 405 by means of the screws 433.

When the module 400 is mounted into the enclosure 300, the buffer springs 432 exert an elastic force between the module 400 and the enclosure 300. Thus, even if an external force is exerted on the disk array device 20, it can be prevented from being directly exerted on the HDDs 401. Therefore, the HDDs 401 and thus the data stored thereon can be protected.

The lever holder 403 and the shield spring 404 are provided at the front of the frame 405. The shield spring 404 is a pressed metal plate having a magnetic shield effect and an elastic property. The shield spring 404 is provided with side spring detents 428 on its side parts and spring detents 427 on its upper and lower parts. The shield spring 404 is fixed on the lever holder 403 and then mounted on the frame 405.

In detail, the side spring detents 428 are internally engaged to the lever holder 403 and the upper detent 427 is engaged in an engagement hole 425 of the lever holder 403. In this manner, the shield spring 404 is attached to the lever holder 403. In this state, fixed detents 424 extending rearward from the lever holder 403 penetrate through insertion holes (not shown) formed on the shield spring 404 and protrudes rearward from the shield spring 404.

In order to secure the lever holder 403 and the shield spring 404 onto the frame 405, the lever holder 403 with the shield spring 404 being attached thereon is inserted into the frame 405 and the fixed detents 424 formed on the lever holder 403 are fitted into fixed detent receiving-holes 430 formed through the frame 405. In this manner, the lever holder 403 and the shield spring 404 are secured at the front of the frame 405.

The rear holder 406 is attached to the rear of the frame 405. In detail, fixed detents 429 are formed on the rear holder 406 and fixed detent receiving-holes 431 for receiving fixed detents 429 are formed on the frame 405. Therefore, by fitting the fixed detents 429 into the fixed detent receiving-holes 431, the rear holder 406 is attached to the frame 405.

Now, the structure of the lever holder 403 and the structures of the lever 402 and the operation button 407 attached to the lever holder 403 will be described in detail. The lever 402, the lever holder 403 and the operation button 407 are all resin molded members.

First, the lever holder 403 will be described. The lever holder 403 includes a holder main body 420 serving as a housing. Inside the holder main body 420, a lever mounting opening 421 whereto the lever 402 is mounted and a button mounting opening 422 whereto the operation button 407 is mounted are formed. Further, at the top of the holder main body 420, a lock part-receiving recess 426 is formed whereto an operation restriction lever 501 of the security lock part 500 is inserted. This will be described below.

Referring now to FIG. 7, a region near the position where the operation button 407 is provided on the holder main body 420 is considered. As shown in FIG. 7, a holder side engagement detent 435 is provided at the top part of the holder main body 420 such that it extends towards the lever 402. In a state where the lever 402 is attached to the lever attachment opening 421 of the lever holder 403 (the state shown in FIGS. 5 and 7), the holder side engagement detent 435 engages the lever 402 so as to hold the lever 402 in a mounted state.

The structure of the lever 402 will be described. The lever 402 is pivotably attached to the lever holder 403. In detail, a shaft hole 417 formed through the lever 402 and a shaft hole 423 formed through the lever holder 403 are positioned so as to be coaxial with each other and a lever-fixing pin 413 is inserted into thus-positioned shaft holes 417 and 423. In this manner, the lever 402 is rotatably attached to the lever holder 403.

Also, a torsion spring 414 is provided between the lever 402 and the lever holder 403. The torsion spring 414 applies an elastic force in a direction biasing the lever 402 towards a normally open position (open direction).

A lever side engagement detent 412 is provided on the top end of the lever 402. The lever side engagement detent 412 has a cantilevered structure. Therefore, the lever side engagement detent 412 is elastically deformable in directions shown by arrows A1 and A2 in FIG. 7. Further, a stepped part 445 is formed at an intermediate position of the lever side engagement detent 412. The stepped part 445 is formed at a position corresponding to a disengaging detent 443 formed on the operation button 407.

FIG. 7 shows a mounted state where the lever 402 is at a position mounted to the lever holder 403. In the mounted state, the lever side engagement detent 412 and the holder side engagement detent 435 are in an engaged state. Therefore, even with the lever 402 being elastically biased towards the open direction by the torsion spring 414, the lever 402 remains in its mounted state.

A plurality of front face vent holes 409 are formed on the surface of the lever 402. Also, a grip part 411 is formed on a face of the lever 402 that is opposite to the face provided with the front face vent holes 409. The grip part 411 is gripped by the operator when loading and unloading the module 400 to/from the enclosure 300. Accordingly, the grip part 411 has a shape that facilitates gripping by the operator.

The operation button 407 will be described. The operation button 407 is operated when pulling out the lever 402 from the lever holder 403 from an attached state. As can be seen in FIG. 7, the operation button 407 is an integrated body including a knob part 441, a guide bar 442 and a disengagement detent 443.

The knob part 441 is a part to be pressed when pulling the lever 402 out of the lever holder 403. The knob part 441 is provided in the above-mentioned button mounting opening 422. Also, the guide bar 442 is a rod-like member that extends rearward from the knob part 441. The guide bar 442 is slidably held in a guide hole 436 formed in the holder main body 420.

A coil spring 440 is provided between a wall part 451 where the guide hole 436 is formed and the knob part 441. The coil spring 440 always elastically biases the operation button 407 in the B2-direction in FIG. 7.

An abutment part 444 is provided at an end of the guide bar 442 that is opposite to the end provided with the knob part 441. In other words, the abutment part 444 is provided on the B1-direction end of the guide bar 442. The abutment part 444 has a diameter that is slightly greater than the diameter of the guide bar 442. Therefore, even when the operation button 407 is biased in the B2-direction due to the force exerted by the coil spring 440, the abutment part 444 will abut the wall part 451 and the operation button 407 will not fall off from the holder main body 420.

On the other hand, the disengagement detent 443 is provided at the bottom part of the knob 441. The disengagement detent 443 is configured to correspond to the lever side engagement detent 412 formed on the lever 402. In detail, when the operation button 407 is pressed to move in the B1-direction from the state shown in FIG. 7 in which the lever 402 is in its mounted state, the disengagement detent 443 engages the stepped part 445 and displaces the lever side engagement detent 412 in the A2-direction.

Referring to FIGS. 8 through 13, an operation of mounting/removing the modules 400 of the above-mentioned structure to/from the enclosure 300 will be described.

Figure 8:
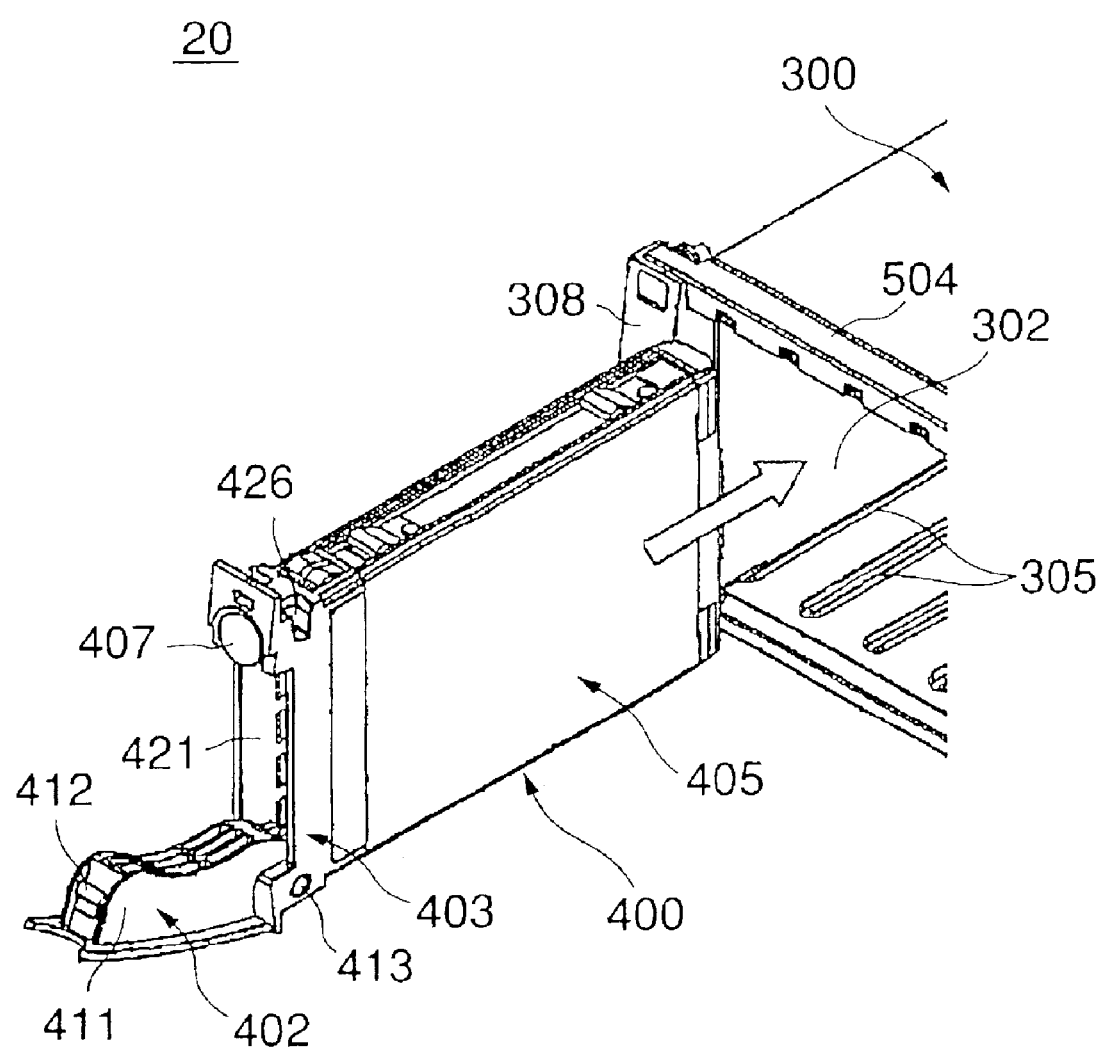
FIG. 8 is a diagram showing how the module is loaded into the enclosure using a module mounting/removing mechanism of an embodiment of the present invention.

FIG. 8 is a diagram showing a state before mounting the module 400 into the enclosure 300. In FIG. 8, the lever 402 is shown in a pulled out positions where it has already been pulled out from the lever holder 403.

In order to mount the module 400 into the enclosure 300 from the state shown in FIG. 8, the operator grips the grip part 411 of the pulled out lever 402 and then positions the rear end part of the frame 405 against the guide part 305 formed on the enclosure 300. Then, the operator pushes the grip part 411 to insert the module 400 into the enclosure 300. The mounting operation is facilitated since the module 400 is inserted while being guided by the guide part 305.

FIGS. 9A and 9B are diagrams showing a state in which not entirely but substantially the whole module 400 is inserted into the enclosure 300. In this state, as shown in FIG. 9B, the first detent part 415 of a pair of detents 415 and 416 formed on the lever 402 engages the rail 306 formed on the enclosure 300.

Then, starting from the state shown in FIGS. 9A and 9B, the lever 402 is pivoted about the lever-fixing pin 413 towards the lever mounting opening 421. As the lever 402 is pivoted, the first detent part 415 moves away from the rail 306 and the second detent part 416 moves towards the rail 306 and touches the rail 306.

When the lever 402 is further pivoted in the direction shown by an arrow in FIGS. 10A and 10B, the second detent part 416 presses the rail 306 towards the left direction in FIG. 10B. As a counteraction, the module 400 is moved and biased towards the right direction, i.e., a direction in which the module 400 is pushed into the enclosure 300. Due to the principle of leverage, the biasing force is greater than the force applied by the operator when he/she simply pushes the module 400 into the enclosure 300.

It is to be noted that, when mounting the module 400 into the enclosure 300, it is necessary to attach the connector 408 provided on the HDD 401 to the connector (not shown) of the back board 310. When attaching the connector 408 to the connector of the back board 310, a relatively strong force is required. In the present embodiment, when the lever 402 is pivoted, the module 400 is pressed in by a strong pressing force generated by the principle of leverage in the manner described above. Therefore, the module 400 can be positively loaded into the enclosure 300 with a small operation force.

Also, in a state where the module 400 is positively loaded in the enclosure 300, the lever 402 is accommodated in the lever holder 403. FIGS. 10A and 10B are diagrams showing a mounting state of the disk array device 20. In this mounting state, the lever side engagement detent 412 engages with the holder side engagement detent 435 formed on the lever holder 403. Thus, the movement of the lever 402 towards the open direction is restricted by the operation button 407. It is to be noted that in this mounting state, the disengagement detent 443 of the operation button 407 is at a position separate from the stepped part 445 formed on the lever side engagement detent 412.

Figure 2:
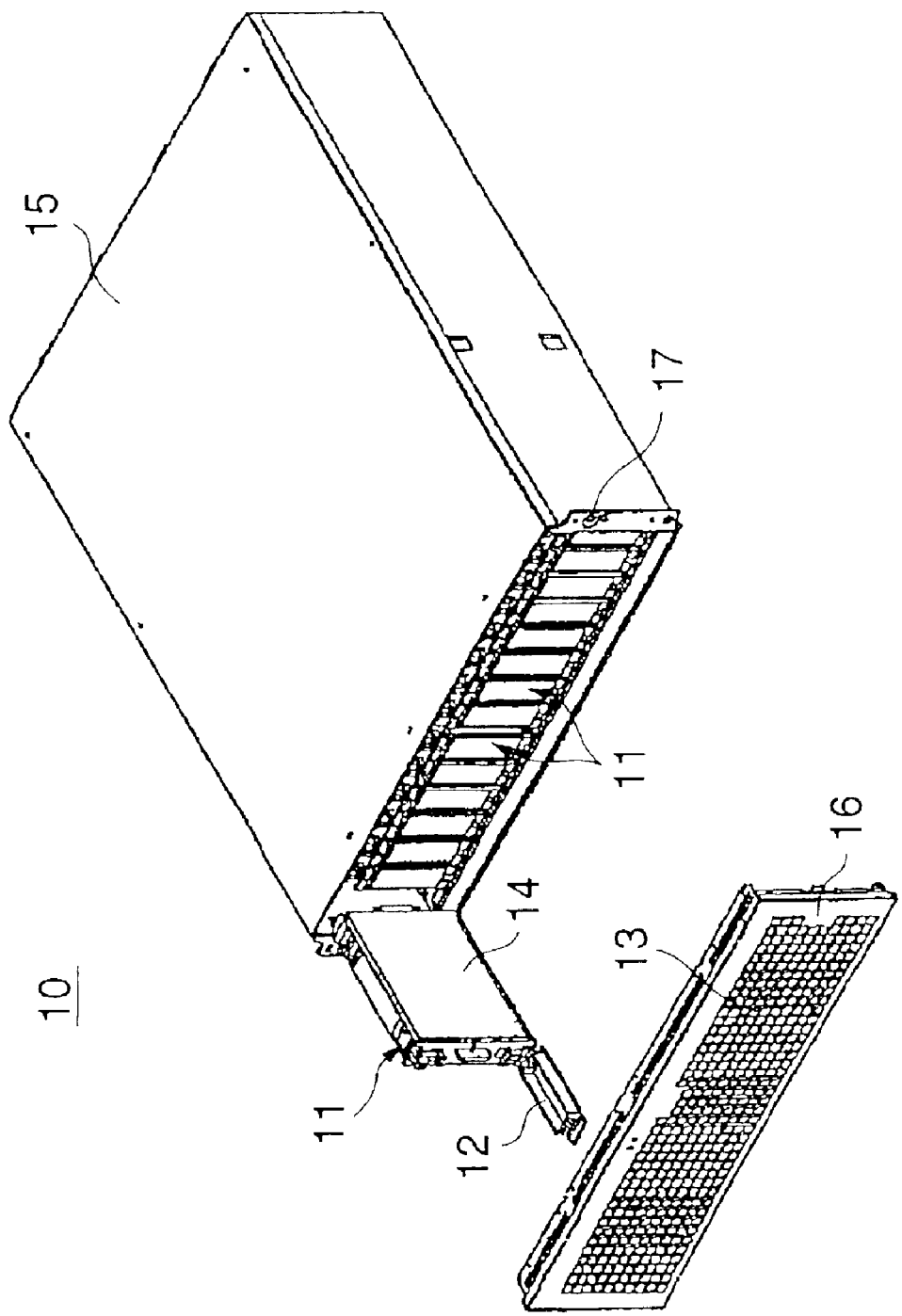
FIG. 2 is a perspective diagram showing a disk array device having a module mounting/removing mechanism of an example of the related art with a bezel cover being removed.

FIGS. 3 and 14A are diagrams showing the disk array device 20 with all modules 400 being mounted. As can be seen in each figure, the disk array device 20 of the present embodiment is not provided with the bezel cover of the related art (see FIG. 2). Instead, in the disk array device 20 of the present embodiment, the levers 402 respectively provided on the module 400 serves as a cover.

Accordingly, the lever 402 has a function as a cover for closing the lever mounting opening 421 of the lever holder 403 and a function as a grip part for pulling the module 400 out of the enclosure 300. Thus, the number of components required for the disk array device 20 is reduced as compared to the disk array device of the relate art, so that a reduced device cost and a compact structure of the device can be achieved.

Also, as has been described above, the plurality of front face vent holes 409 are formed on the surface of the lever 402. When the lever 402 is in its mounting state, a gap is formed between the grip part 411 and the lever holder 403. This gap serves as a side part vent hole 410.

As shown in FIG. 14B, the cooling fans 311 are provided on the back face of the enclosure 300. When the cooling fans 311 are driven, the cooling air flows as shown by arrows in FIGS. 14A and 14B. According to the present embodiment, since the plurality of front face vent holes 409 are formed on the surface of the lever 402 and the side part vent hole 410 is formed on the side face, the cooling air can be efficiently supplied inside the modules 400.

Figure 15:
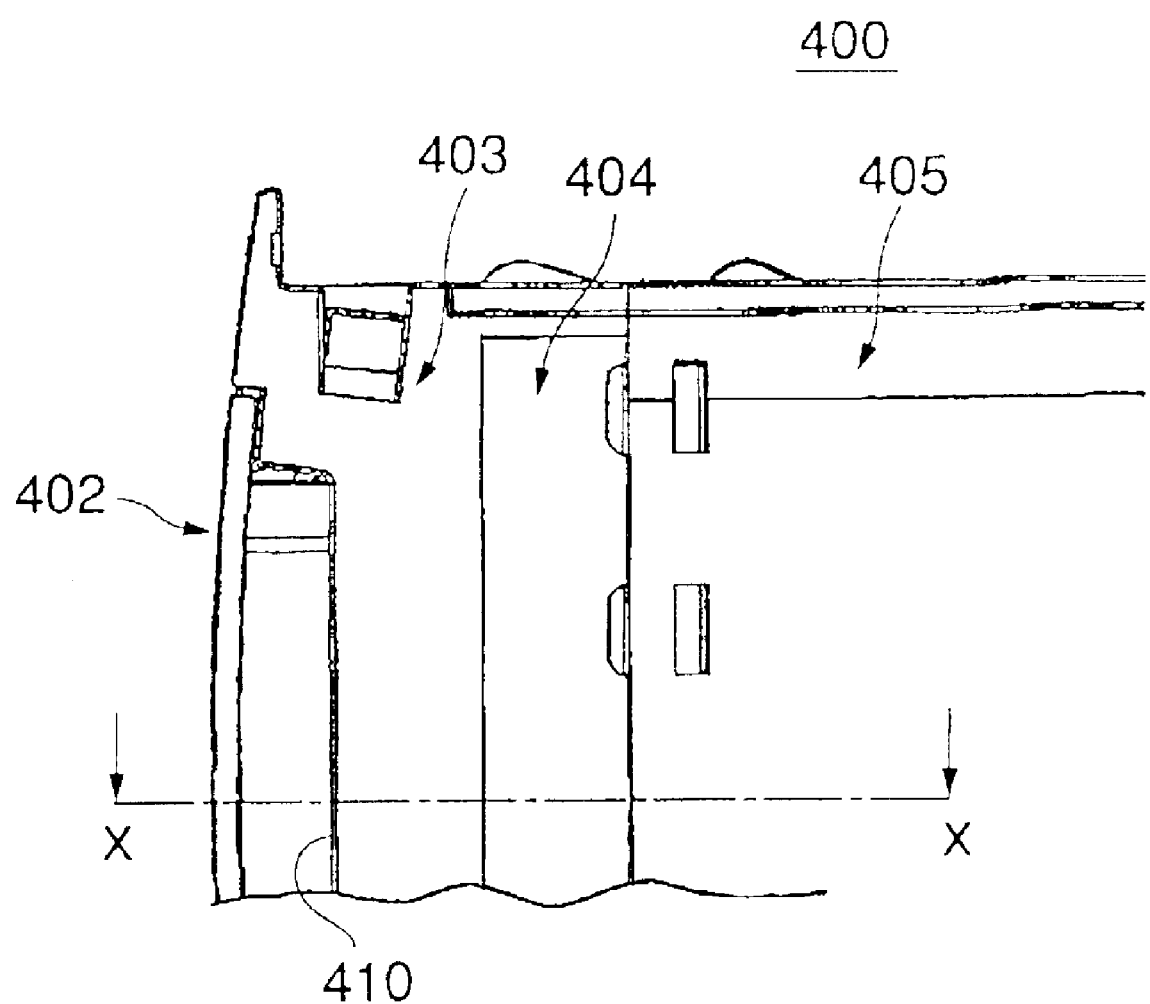
FIG. 15 is a diagram showing a cooling mechanism of electronics in the module mounting/removing mechanism of an embodiment of the present invention.
Figure 16:
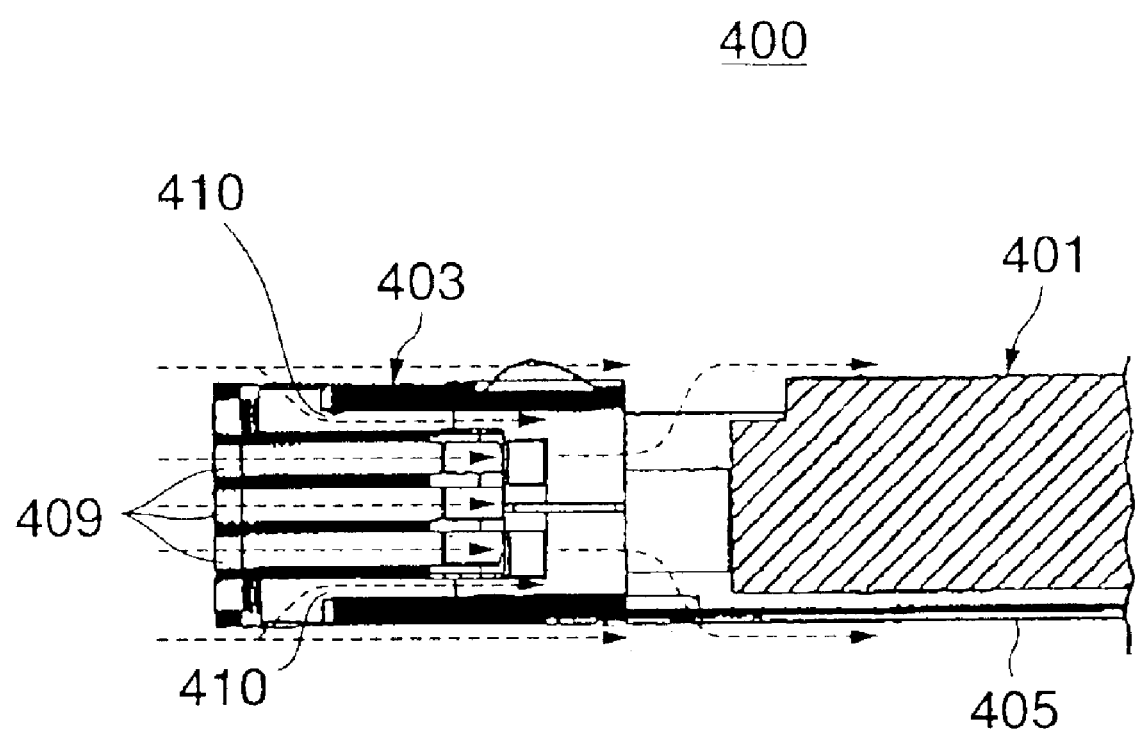
FIG. 16 is a diagram showing a cooling mechanism of electronics in the module mounting/removing mechanism of an embodiment of the present invention.

FIG. 16 is a cross-sectional diagram of the module 400 along the X—X line shown in FIG. 15. In FIG. 16, arrows shown by broken lines indicate flow of the cooling air. As shown in the figure, the cooling air taken in from the front face vent holes 409 and the side part vent hole 410 flows substantially linearly through the lever holder 403 and is supplied to the HDD 401. In such a manner, a greater quantity of cooling air can be supplied to the HDD 401 so as to improve cooling efficiency of the HDD 401.

Now, an operation of pulling out the module 400 from the enclosure 300 will be described. In order to pull out the module 400 from the enclosure 300, the operation button 407 is pressed as shown in FIG. 11. As a result of this pressing operation, the operation button 407 is pressed against the biasing force of the coil spring 440 and is displaced in the direction shown by an arrow B1 in FIG. 7. Also, the disengagement detent 443 formed on the operation button 407 is displaced in the direction shown an arrow B1 in FIG. 7.

As a result of the displacement in the B1-direction, the disengagement detent 443 abuts and presses the stepped part 445. Consequently, the lever side engagement detent 412 having a cantilever shape is displaced in the A2-direction in FIG. 7. Thereby, the lever side engagement detent 412 and the holder side engagement detent 435 are disengaged.

Since the lever side engagement detent 412 has an elastically deformable cantilever shape, the lever side engagement detent 412 and the holder side engagement detent 435 are positively engaged due to an elastic force. Also, a disengagement operation is facilitated since at least the lever side engagement detent 412 is pressed by the operation button 407 and elastically deformed.

Also, as has been described above, due to the elastic force of the torsion spring 414, the lever 402 is always elastically biased against the lever holder 403 towards the open direction. Therefore, when the operation button 407 is operated in a manner described above and the lever side engagement detent 412 and the holder side engagement detent 435 are disengaged, the lever 402 pivots due to the elastic force of the torsion spring 414.

Figure 12A:
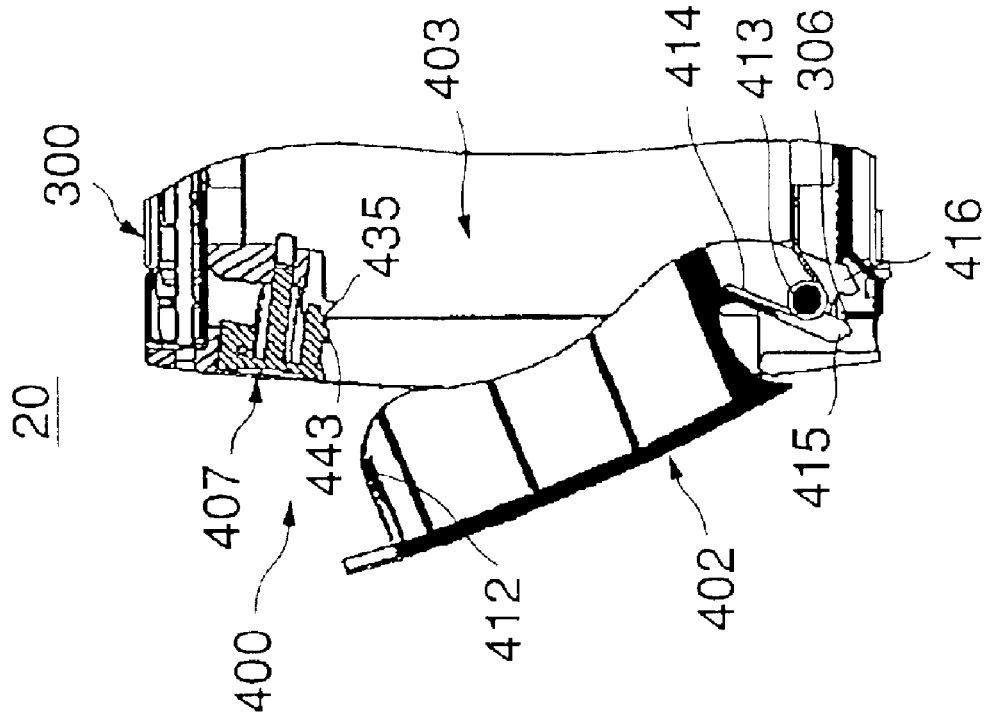
FIGS. 12A and 12B are diagrams showing how the module is unloaded from the enclosure using a module mounting/removing mechanism of an embodiment of the present invention.
Figure 12B:
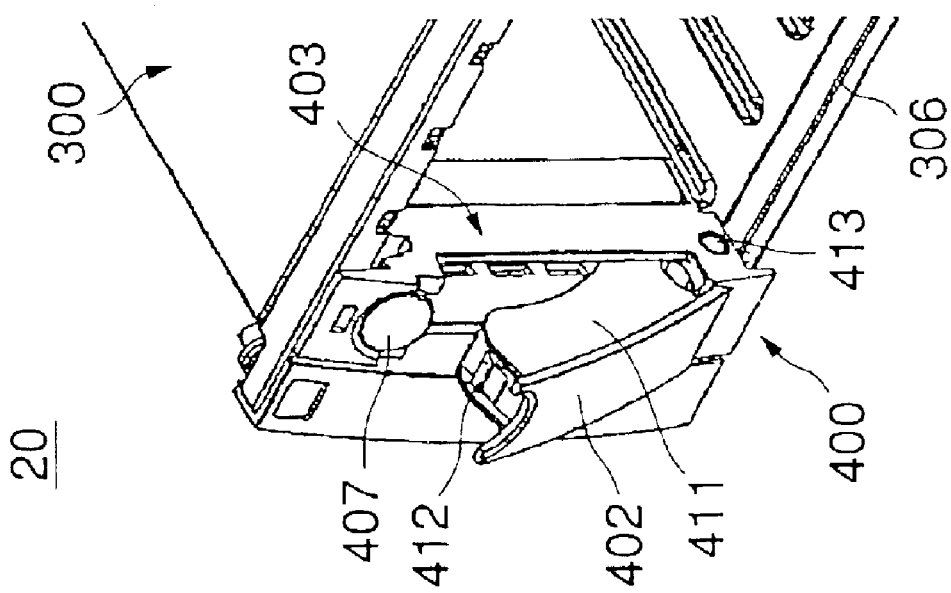

FIGS. 12A and 12B are diagrams showing a state where the lever 402 has been pivoted due to an elastic force exerted by the torsion spring 414. As shown in the figures, the first detent part 415 is configured to engage the rail 306 to restrict a pivotal movement of the lever 402. In this state, the operator grips the grip part 411 of the lever and operates the lever 402 such that the lever 402 is pivoted towards the pulled out position shown in FIG. 13.

As a result of the pivoting operation, the first detent part 415 presses the rail 306 in the right direction shown in FIG. 12B and, as a counteraction, the module 400 is moved and biased towards the left direction, i.e., a direction in which the module 400 is pulled out of the enclosure 300. Due to the principle of leverage, the biasing force is greater than the force applied by the operator when he/she simply pulls out the module 400 from the enclosure 300. Accordingly, an operation of detaching the connector 408 provided on the HDD 401 and the connector of the back board can be achieved with a reduced operating force.

Figure 13:
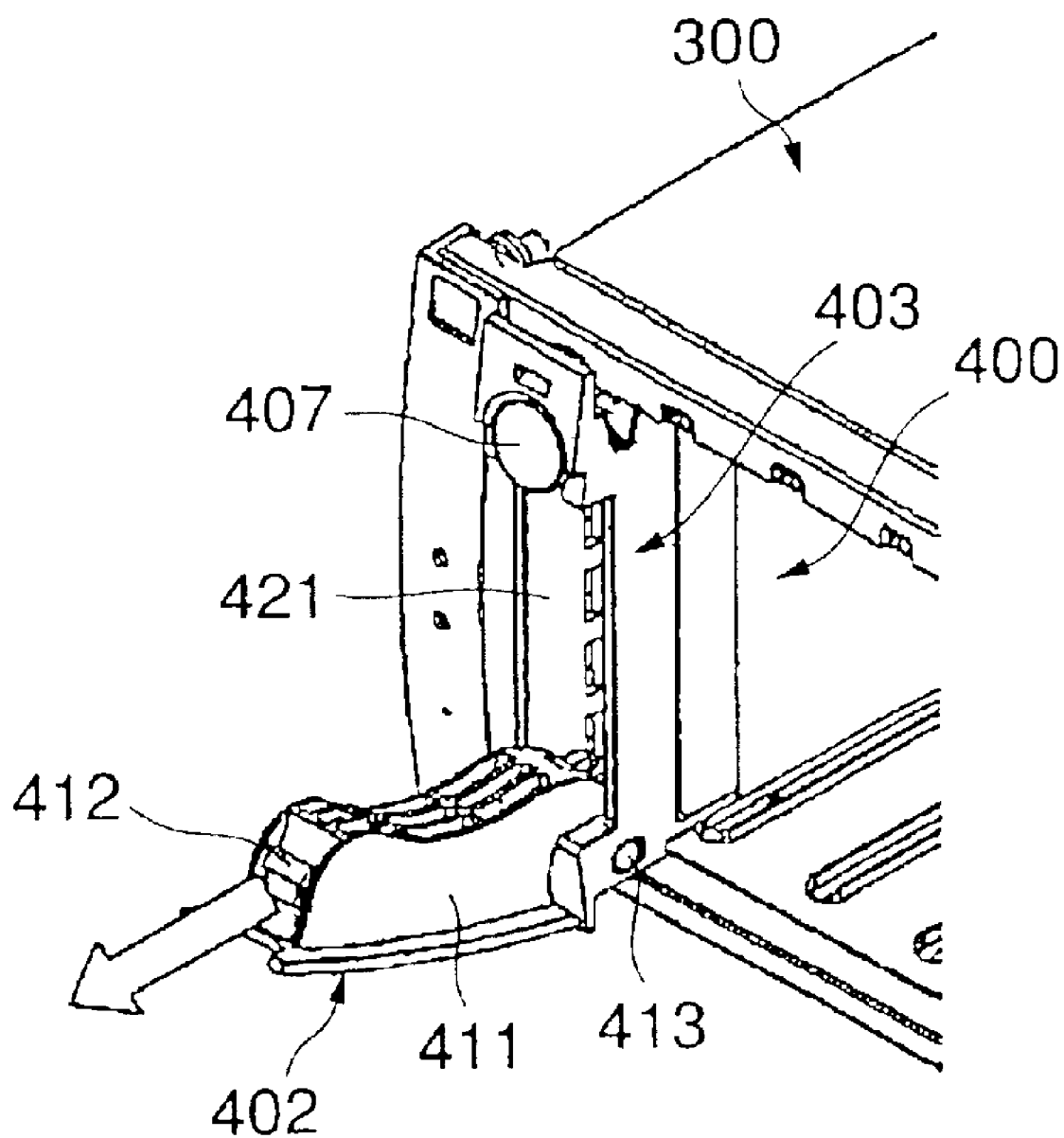
FIG. 13 is a diagram showing how the module is unloaded from the enclosure using a module mounting/removing mechanism of an embodiment of the present invention.

Then, as can be seen in FIG. 13, when the lever 402 is pivoted through to the pull out position, the operator grips the lever 402 (the grip part 411) to pull out the module 400 from the enclosure 300. In this manner, an operation of pulling out the module 400 from the enclosure 300 is completed.

Figure 1:
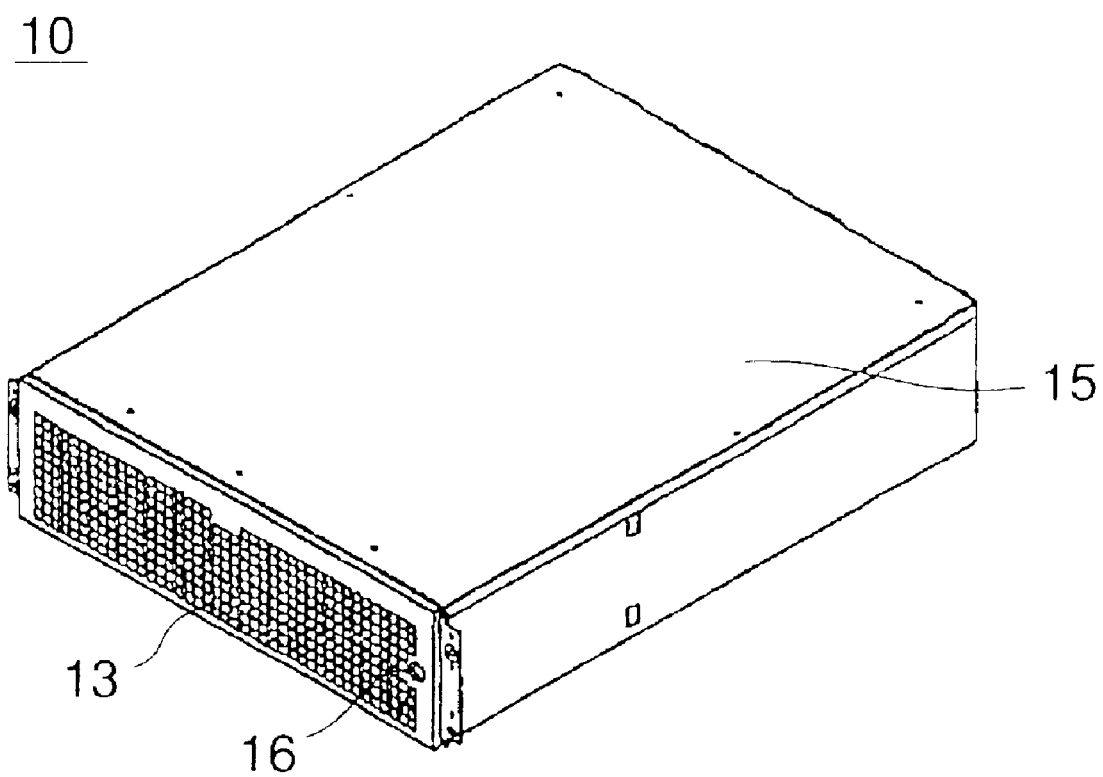
FIG. 1 is a perspective diagram showing a disk array device having a module mounting/removing mechanism of an example of the related art.

As has been described above, according to the present embodiment, the lever 402 also serves as a cover. Therefore, in order to pull out the module 400 from the enclosure 300, it is not necessary to perform conventional methods in which an operation of moving the bezel cover 13 and an operation of pulling out the lever 12 (see FIG. 1) are performed separately. Accordingly, the operation of loading and unloading the module 400 to the enclosure 300 is facilitated. Further, according to the disk array device 20 of the present embodiment, the lever 402 can be pulled out from the lever holder 403 by simply pressing the operation button 407. Therefore, the module 400 can be loaded and unloaded from the enclosure 300 with improved operability.

Figure 17:
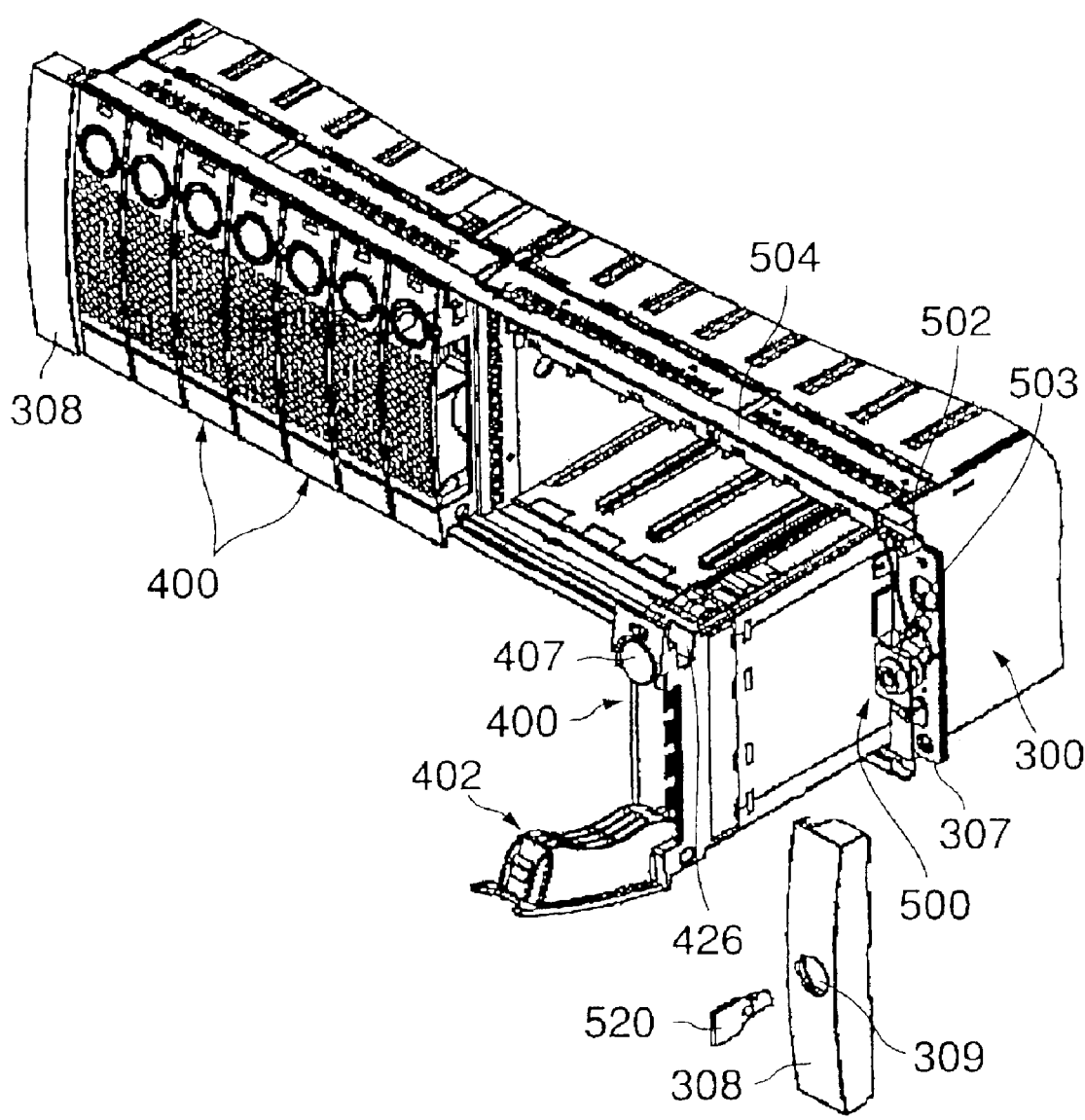
FIG. 17 is an exploded perspective diagram showing general structure of a security lock part provided on the module mounting/removing mechanism of an embodiment of the present invention.

Referring now to FIGS. 17 thorough 20, the security lock part 500 will be described. The security lock part 500 generally includes an operation restriction lever 501, a slide rail 502 and a locking mechanism 503.

Figure 18:
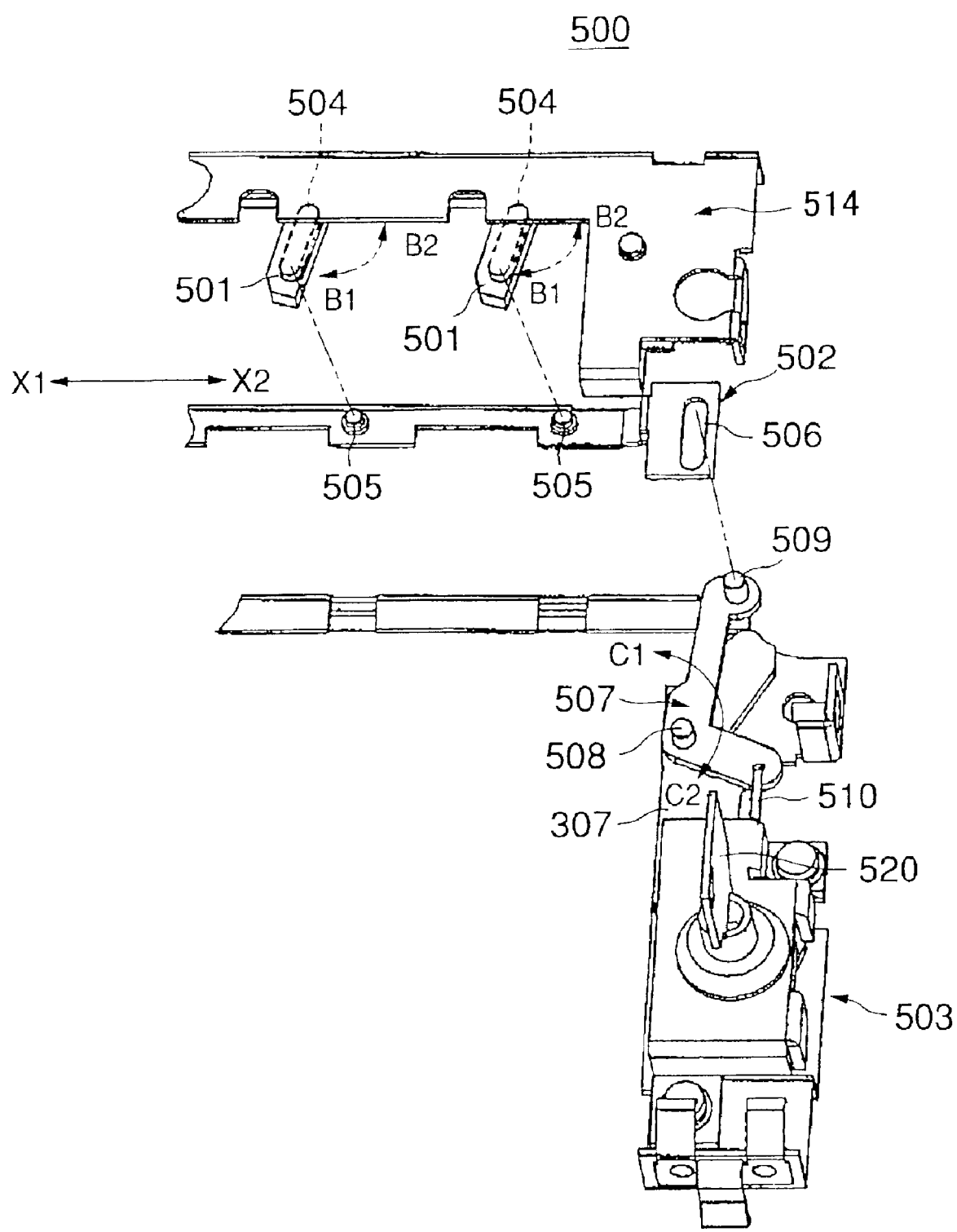
FIG. 18 is an enlarged exploded perspective diagram of the security lock part of FIG. 17.

As can be seen in FIG. 18, the operation restriction lever 501 is provided on the fixed frame 514 such that it can oscillate in the B1- and B2-directions shown in FIG. 18. Also, as can be seen in FIG. 17, the fixed frame 514 is fixed at the top part of the enclosure 300. Also, the operation restriction lever 501 is journalled on a spindle (not shown) provided on the fixed frame 514. Accordingly, the operation restriction lever 501 is configured such that it can oscillate with respect to the fixed frame 514.

As will be described later, the operation restriction lever 501 is configured to enter into or retracted from the lock part-receiving recess 426 formed on the lever holder 403 of the module 400. The operation restriction lever 501 enters the lock part-receiving recess 426 and engages the operation button 407 to restrict (lock) the operation of the operation button 407. Accordingly, a plurality of operation restriction levers 501 are provided at positions corresponding to loading positions of the plurality of modules 400 to be loaded in the enclosure.

Also, each operation restriction lever 501 is provided with an elongated groove 504. The groove 504 is configured to engage with the pin 505 provided on the slide rail 502. The slide rail 502 is configured to be slidable in the X1- and X2-directions when the locking operation of the keylock mechanism 503 is performed as will be described later.

Therefore, when the slide rail 502 slides in the X1-direction, the pin 505 is also displaced in the X1-direction and thus the operation restriction lever 501 moves in the B1-direction (direction of entry). When the slide rail 502 slides in the X2-direction, the pin 505 is also displaced in the X2-direction and thus the operation restriction lever 501 moves in the B2-direction (direction of retraction).

The keylock mechanism 503 is provided on the collar part 307 of the enclosure 300. When the key 520 is inserted and turned, the keylock mechanism 503 causes the oscillation lever 507 to oscillate via the link member 510. An engagement pin 509 is provided at the top end part of the oscillation lever 507. The engagement pin 509 is configured to engage an elongated hole 506 formed on an end part (in this embodiment, the X2-direction end part) of the slide rail 502.

Further, in order to give a better aesthetic appearance of the disk array device 20, the side cover 308 is provided over the keylock mechanism 503 and the oscillation lever 507. The key insertion hole 309 via which the key 520 is inserted into the keylock mechanism 503 is formed through the side cover 308.

Figure 19:
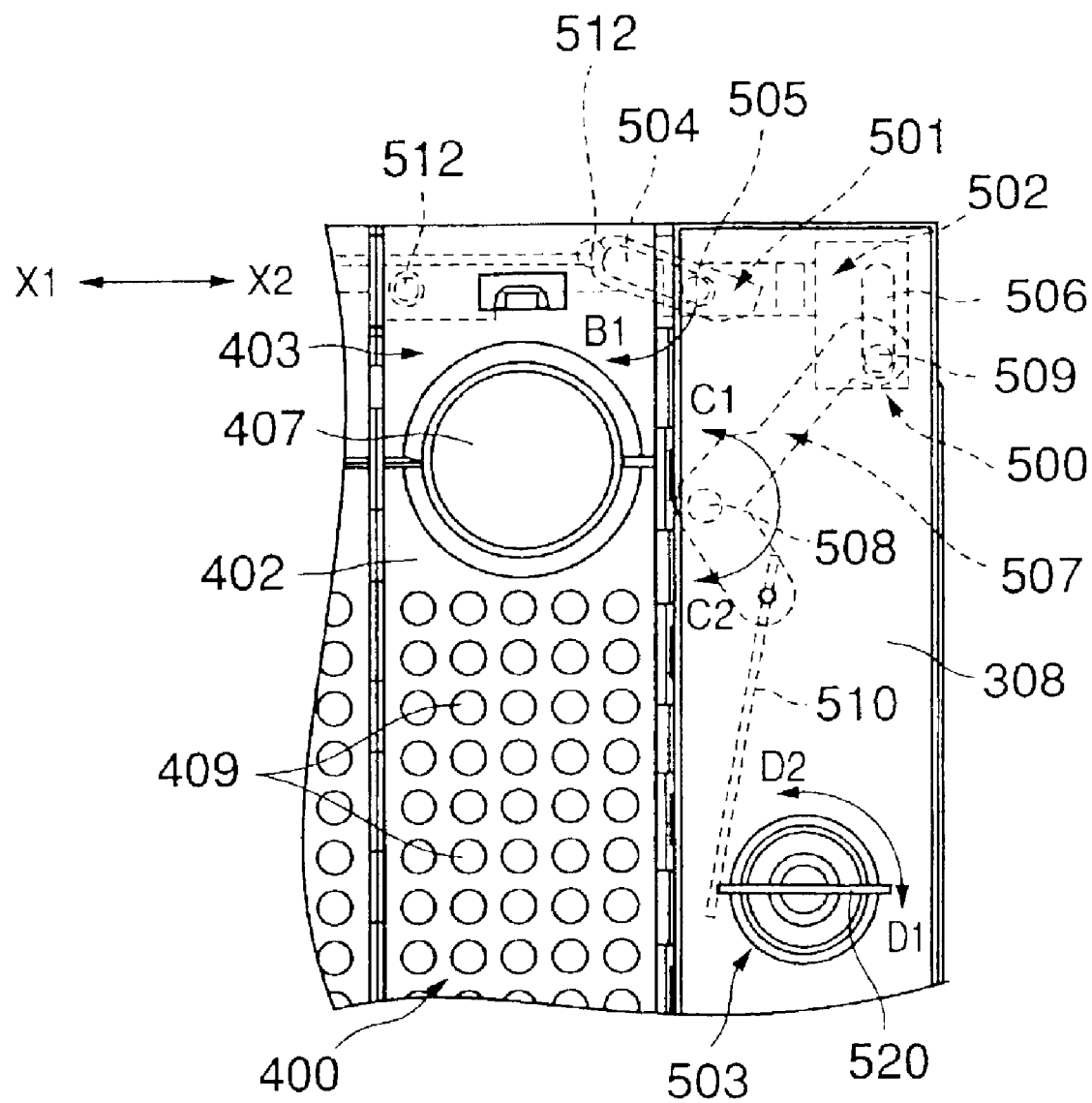
FIG. 19 is a diagram showing an operation of the security lock for an unlocking operation.

The operation of the security lock part 500 of the above-mentioned structure will be described with reference to FIGS. 19 and 20. In FIGS. 19 and 20, for the sake of convenience, only the right hand side cover 308 on the enclosure 300 and the module 400 accommodating the rightmost position is illustrated. However, it is to be noted that similar locking operations can be performed for other modules 400.

FIG. 19 shows a state in which the operation button 407 has been unlocked. From the unlocked state, the key 520 is turned in the D2-direction. The oscillating lever 507 is turned in the C2-direction via the link member 510 and thus the operation restriction lever 501 is slid in the X2-direction via the engagement pin 509.

As has been described, while the operation restriction lever 501 is being slid in the X2-direction, the restriction lever 501 moves in the B2-direction. In this state, the operation restriction lever 501 is in a position retracted from the lock part-receiving recess 426. Accordingly, the operation button 407 is in an operable state (i.e., unlocked state). In this unlocked state, the modules 400 are mounted to or removed from the enclosure 300.

On the other hand, in order to lock the modules 400 such that the modules 400 cannot be mounted to or removed from the enclosure 300, the key 520 is turned in the D1-direction. As a result, the oscillation lever 501 oscillates in the X1-direction via the link member 510. Then, via the engagement pin 509, the operation restriction lever 501 slides in the X1-direction and the operation restriction lever 501 moves in the B1-direction. In this state, the operation restriction lever 501 is at a position entered into the lock part-receiving recess 426 of the module 400.

Referring to FIG. 7, a dash-dot line shows a state where the operation restriction lever 501 is entered into the lock part-receiving recess 426. As can be seen in FIG. 7, in a state where the operation restriction lever 501 is entered into the lock part-receiving recess 426, the operation restriction lever 501 is located at the back part of the knob 441 of the operation button 407.

Accordingly, in this locked state, even if the operation button 407 is pressed, the back face of the knob 441 touches the operation restriction lever 501. Therefore, a pressing operation of the operation button 407 is not possible. Also, since an operation of the operation button 407 is disabled, the lever 402 cannot be pulled out of the lever holder 403. Accordingly, the modules 400 are prevented from falling out of the enclosure 300.

Thus by providing the security lock part 500, when the key is locked, the operation restriction lever 501 engages the operation button 407 and any operation of the operation button 407 is prohibited. Thus, with the key being locked, the lever 402 cannot be pulled out of the lever holder 403. Therefore, even if the levers 402 are configured to serve as a cover for covering the front face of the enclosure 300 (i.e., even if the conventional bezel cover 13 is dispensed with) as in the present embodiment, the locking operation prevents the module 400 from being pulled out of the enclosure 300.

It is to be noted that, as has been described above, a plurality of operation restriction levers 501 are provided at positions corresponding to mounting positions of the plurality of modules 400 to be mounted in the enclosure. The plurality of operation restriction levers 501 can be moved simultaneously by turning the key 520 to a lock position so as to lock the operation buttons 407 of the modules 400. Accordingly, the plurality of modules 400 loaded in the enclosure 300 can be locked in an easy and simple manner.

FIGS. 21A and 21B are diagrams showing a two-level enclosure 300A provided with a security lock part 500A and FIGS. 22A and 22B are diagrams showing a two-level enclosure 300A provided with a security lock part 500B. It is to be noted that for the security lock parts 500A and 500B shown in FIGS. 21A through 22B, those elements similar to the elements shown in FIGS. 3 through 20 are indicated with corresponding reference numerals.

Each of the security lock parts 500A and 500B is provided with an upper slide rail 502A and a lower slide rail 502B. Each of the slide rails 502A and 502B is provided with an operation restriction lever 501. The operation lever 501 is moved when each of the slide rails 502A and 502B are slid, so as to lock and unlock the operation buttons 407.

It is also possible to provide security lock parts for upper and lower levels of the enclosure, respectively. However, a structure having separate security lock parts reduces operability while increasing the number of components and the size of the device. Therefore, the security lock parts 500A and 500B shown in FIGS. 21 and 22 are configured such that all of the modules 400 that are mounted in both the upper and lower levels can be locked and unlocked in a single operation of the key 520.

The security lock part 500A shown in FIGS. 21A and 21B is characterized in that the upper slide rail 502A and the lower slide rail 502B are connected by a connection member 513A. The security lock part 500B shown in FIGS. 22A and 22B is characterized in that an upper oscillation lever 507A for sliding the upper slide rail 502A and a lower oscillation lever 507B for sliding the lower slide rail 502B are connected by a connecting member 513B.

With the structure described above, all of the modules 400 loaded in both the upper and lower levels can be locked and unlocked in a single operation of the key 520. Therefore, even if the enclosure 300 is configured into a multi-level structure (also including three or more levels), a locking and unlocking operation of the module 400 can be performed with good operability.

Further, the present invention is not limited to these embodiments, and variations and modifications may be made without departing from the scope of the present invention.

The present application is based on Japanese priority application No. 2002-207040 filed on Jul. 16, 2002, the entire contents of which are hereby incorporated by reference.

What is claimed is:

1. A module array apparatus comprising:
   an enclosure having an opening at a front end;
   at least one module configured to be mounted in a corresponding mounting area in said opening of said enclosure;
   said module having a frame member, a lever holder provided at the front of said frame member and a lever member that is pivotably attached to said lever holder so as to be movable between a first position received by said lever holder in which it serves as a part of a front face of said enclosure and as a cover of said lever holder, and a second position in which it serves as a grip part for pulling said module out of said enclosure;
   at least one securing mechanism configured to secure said at least one module to said enclosure;
   said lever member being provided with an engagement mechanism configured to engage said lever member with said module; and
   a disengagement mechanism operatively provided on said lever holder for disengaging said lever member from said module, said disengagement mechanism being configured to be restricted from operation by a locking mechanism provided on the enclosure.

2. The module array apparatus as claimed in claim 1, wherein said module contains an electronic device.

3. The module array apparatus as claimed in claim 1, wherein said module contains a hard disk drive device.

4. The module array device as claimed in claim 1, further comprising:
   a cooling mechanism;
   wherein said lever member is provided with cooling holes such that cooling air from said cooling mechanism passes through the cooling holes.

5. A module configured to be mounted in a mounting area in an opening of an enclosure having the opening at a front end, said module comprising:
   a frame member;
   a lever holder provided at the front of said frame member; and
   a lever member that is pivotably attached to said lever holder so as to be movable between a first position received by said lever holder in which it serves as a part of a front face of said enclosure and as a cover of said lever holder, and a second position in which it serves as a grip part for pulling said module out of said enclosure;

said lever member being provided with an engagement mechanism configured to engage said lever member with said module;

a disengagement mechanism provided on said lever holder for disengaging said lever member from said module, said disengagement mechanism being configured and adapted to be restricted from operation by a locking mechanism provided on the enclosure.

6. A module mounting/removing mechanism for mounting and removing a plurality of modules in a plurality of mounting areas in a housing, comprising:

a holder provided on each of said modules;

a lever member provided on said holder so as to be movable between a first position in which it serves as a part of a front face of said housing and as a cover for closing said holder, and a second position in which it serves as a grip part for pulling said module out of said housing;

a first engagement part formed on said lever member;

a second engagement part formed on said holder for securing said lever member at said first position by being engaged with the corresponding first engagement part;

a securing part formed on an opposite end of said lever member from said first engagement part;

a restriction member provided on said housing, said restriction member being secured to said securing part at the first position of said lever member and, while the module is loaded in the housing, restricting a movement of said module in a removing direction; and an operation button operably provided on said holder such that, when operated, it releases an engagement between said first engagement part and said second engagement part, said operation button being configured to be restricted from releasing said first and second engagement parts by a keylock mechanism provided on said housing.

7. The module mounting/removing mechanism as claimed in claim 6, wherein said lever member is provided with cooling holes.

8. The module mounting/removing mechanism as claimed in claim 6, wherein said first engagement part has a cantilever shape, and when said operation button is moved by a pressing operation, said first engagement part is displaced so as to release an engagement between said first engagement part and said second engagement part.

9. The module mounting/removing mechanism as claimed in claim 6, wherein said key lock mechanism comprises:

an operation restricting member movable between an engagement position where it engages with said operation button and a disengagement position where it is released from said operation button so as to restrict a movement of said operation button when it engages with said operation button at said engagement position; and a locking mechanism for moving said operation restriction member to said engagement position by a locking operation and moving said operation restriction member to a position outside said engagement position by an unlocking operation.

10. The module array apparatus as claimed in claim 6, wherein said module contains an electronic device.

11. The module array apparatus as claimed in claim 6, wherein said module contains a hard disk drive device.

12. A disk array device configured to contain a plurality of disk devices in corresponding mounting areas in a housing such that the disk devices can be mounted to and/or removed from said housing, comprising:

a holder provided at a front of a frame member holding a disk device;

a rail provided on said housing to serve as a guiding member for mounting and removing said frame member;

a lever member provided on said holder so as to be movable between a first position in which it serves as a part of a front face of said housing and as a cover for closing said holder, and a second position in which it serves as a grip part for pulling said module from said housing;

a first engagement part formed on said lever member;

a second engagement part formed on said holder for securing said lever member at said first position by being engaged with corresponding one of said first engagement part;

a securing part formed on an opposite end of said lever member from said first engagement part;

a restriction member provided on said housing, said restriction member being secured to said securing part at the first position of said lever member and, while the module is mounted in the housing, restricting a movement of said module in a removing direction;

an operation button operably provided on said holder such that, when operated, it releases an engagement achieved by said securing mechanism between said first engagement part and said second engagement part; said operation button being configured to be restricted from releasing said first and second engagement parts by a lock mechanism provided on said housing.

13. The disk array device as claimed in claim 12, further comprising:

a cooling mechanism;

wherein said lever member is provided with cooling holes such that cooling air from said cooling mechanism passes through the cooling holes.

14. The module array apparatus as claimed in claim 1, wherein said locking mechanism includes a keylock mechanism provided on one of the side walls of the enclosure.

15. The module mounting/removing mechanism as claimed in claim 6, wherein said keylock mechanism is provided on one of the side surfaces of said housing.

16. The module mounting/removing mechanism as claimed in claim 12, wherein said keylock mechanism is provided on one of the side surfaces of said housing.

* * * * *